(12) United States Patent
Cheng

(10) Patent No.: US 12,355,324 B2
(45) Date of Patent: Jul. 8, 2025

(54) SWITCH CONTROL METHOD, RECEIVING END CONTROL METHOD, SELF-GENERATING SWITCH AND RECEIVING END

(71) Applicant: Wuhan Linptech Co., Ltd., Wuhan (CN)

(72) Inventor: Xiaoke Cheng, Wuhan (CN)

(73) Assignee: Wuhan Linptech Co., Ltd., Wuhan (CN)

(*) Notice: Subject to any disclaimer, the term of this patent is extended or adjusted under 35 U.S.C. 154(b) by 127 days.

(21) Appl. No.: 18/504,825

(22) Filed: Nov. 8, 2023

(65) Prior Publication Data

US 2024/0088772 A1 Mar. 14, 2024

Related U.S. Application Data

(63) Continuation of application No. PCT/CN2022/092152, filed on May 11, 2022.

(30) Foreign Application Priority Data

May 16, 2021 (CN) .......................... 202110531075.2

(51) Int. Cl.
*H02K 35/02* (2006.01)
*G08C 17/02* (2006.01)

(52) U.S. Cl.
CPC ............. *H02K 35/02* (2013.01); *G08C 17/02* (2013.01)

(58) Field of Classification Search
CPC .............................. H02K 35/02; G08C 17/02
See application file for complete search history.

(56) References Cited

U.S. PATENT DOCUMENTS

| 5,151,696 A | 9/1992 | Kasahara et al. | |
|---|---|---|---|
| 10,115,512 B2* | 10/2018 | Koch | H01H 1/20 |
| 10,673,313 B2* | 6/2020 | Liu | H02K 35/02 |
| 12,002,632 B2* | 6/2024 | Gumina | H01H 1/5805 |
| 2018/0131371 A1* | 5/2018 | Liu | H03K 17/94 |
| 2018/0191232 A1* | 7/2018 | Zou | H01F 41/0233 |
| 2018/0308650 A1* | 10/2018 | Koch | H01H 50/641 |
| 2019/0097512 A1* | 3/2019 | Liu | H02K 7/1876 |
| 2022/0102091 A1* | 3/2022 | Caspers | H01H 13/14 |
| 2022/0283629 A1* | 9/2022 | Bright | G01L 1/14 |
| 2023/0004208 A1* | 1/2023 | Chiang | H02J 7/32 |

(Continued)

FOREIGN PATENT DOCUMENTS

| CN | 108882239 A | 11/2018 |
|---|---|---|
| CN | 211267192 U | 8/2020 |

(Continued)

*Primary Examiner* — Adam D Houston

(57) ABSTRACT

A switch control method, a receiving end control method, a self-generating switch, and a receiving end, the switch control method comprising: the processor sending a corresponding current control message to a receiving end via the wireless communication module, such that the receiving end verifies whether a relationship between a current verification identifier in the current control message and a stored historical verification identifier matches a pre-set transformation rule of the current verification identifier, and executing a control event corresponding to current manipulation information when the relationship matches the transformation rule.

20 Claims, 27 Drawing Sheets

(56) References Cited

U.S. PATENT DOCUMENTS

| | | | | |
|---|---|---|---|---|
| 2023/0114041 A1* | 4/2023 | Shin | ........................ | H01H 36/00 |
| | | | | 200/336 |
| 2024/0088772 A1* | 3/2024 | Cheng | ..................... | H02K 35/02 |
| 2024/0154439 A1* | 5/2024 | Liu | ........................ | G01V 3/081 |
| 2024/0356464 A1* | 10/2024 | Liu | ....................... | H02N 11/002 |
| 2025/0097578 A1* | 3/2025 | Hu | ......................... | H04N 23/00 |

FOREIGN PATENT DOCUMENTS

| | | | | |
|---|---|---|---|---|
| CN | 113410971 A | | 9/2021 | |
| CN | 113433841 A | | 9/2021 | |
| CN | 113517152 A | * | 10/2021 | ............. G08C 17/02 |
| CN | 113517951 A | | 10/2021 | |
| CN | 216649662 U | | 5/2022 | |
| CN | 117040044 A | * | 11/2023 | ........... H01R 13/665 |
| CN | 115118586 B | * | 2/2024 | ................ F03G 1/00 |
| EP | 4538648 A1 | * | 4/2025 | ............. F16D 27/14 |
| WO | WO-2022242519 A1 | * | 11/2022 | |
| WO | WO-2022242523 A1 | * | 11/2022 | |

* cited by examiner

| Header information | | | | Payload (one AD Structure) | | | | | | | CRC |
|---|---|---|---|---|---|---|---|---|---|---|---|
| Preamble | Access Address | PDU Header | MAC | | Length | AD Type | AD Data | | | | CRC |
| | | | MAC H | MAC L | | | Company ID | Frame Header | Sequence Counter | Switch Type | Key Value | Signature | |
| | | 2 Bytes | 2 Bytes | 4 Bytes | 1 Byte | 1 Byte | 2 Bytes | High-1 byte-low | 4 Bytes | 1 Byte | 1 Byte | 4 Bytes | 3 Byte |
| 0xAA | 0x8E89BED6 | 0x1542 | The highest two bits being 1 indicates the static address, while the rest remains 0 | Source ID | 0x0E | 0xFF | 0x09E2 | Version number / Encryption type / Type ID / Entity type / The count is forwarded, which is initially 0 | The sequence number, starting from 0, is incremented by 1 each time | See switch type assignment (taking K9B as an example, single key: 0x01 double bond: 0x02 triple bond: 0x03) | 0x01-0x1F 0x20-0x3F | Calculated value | Computation value |
| | | | 0xC0 00 | 0x000000FF-0xFFFFFFFF The lower 256 bits are reserved for commissioning in research and development | | | | 0 0 0 0 0 x x x / 0 0 0 0 0 x x x | | | | Calculated value to value from key from length | |

Fig.15

| Header information | | | | | | Payload (one AD Structure) | | | | | | | CRC |
|---|---|---|---|---|---|---|---|---|---|---|---|---|---|
| Preamble | Access Address | PDU Header | MAC | | Length | AD Type | AD Data | | | | | | CRC |
| | | | MAC H | MAC L | | | Company ID | Frame Header | Sequence Counter | Source ID | Switch Type | Key Value | Signature | |
| | | 2 Bytes | 2 Bytes | 4 Bytes | 1 Byte | 1 Byte | 2 Bytes | High-1 byte–low | 4 Bytes | 4 Bytes | 1 Byte | 1 Byte | 4 Bytes | 3 byte |
| 0xAA | 0x8B9B8ED6 | 0x1342 | The highest two bits being 1 indicates the static address, while the rest remains 0 | Source ID | 0x12 | 0xFF | 0x09E2 | Version numbertyp En cr ti on / 0 0 0 1 x x x (The count is forwarded, which is initially 0) | The sequence number, starting from 0, is incremented by 1 each time | 0x00000000FF- 0FFFFFFFF (The lower 256 bits are reserved for commissioning in research and development) | See switch type assignment (taking K9B as an example, single key: 0x01, double bond: 0x02, triple bond: 0x03) | 0x01-0x1F 0x20-0x3F | Calculated value / Calculated value to key from length | Calculated value |
| | | | 0xC0 00 | 0x00000000FF- 0XFFFFFFFF The lower 256 bits are reserved for commissioning in research and development | | | | | | | | | | |

Fig.16

SWITCH CONTROL METHOD, RECEIVING END CONTROL METHOD, SELF-GENERATING SWITCH AND RECEIVING END

TECHNICAL FIELD

The present disclosure relates to the field of self-generating switches, and more particularly, to a switch control method, a receiving end control method, a self-generating switch, and a receiving end.

BACKGROUND ART

A wireless switch can be understood as a switch configured with a wireless communication module, wherein one wireless switch is a self-generating switch, and in a conventional self-generating switch, it is usually communicated to the outside via a radio frequency communication module; for example, the self-generating switch can communicate with various receiving ends (such as a lamp, a wall switch, etc.) via a radio frequency signal.

In the prior art, when a self-generating switch performs control, a control message will be sent out in response to the manipulation on the self-generating switch. However, the content in the control message is relatively simple, and generally only contains information describing a button and a switch, which cannot meet the requirements of security.

SUMMARY OF THE INVENTION

The present disclosure provides a switch control method, a receiving end control method, a self-generating switch and a receiving end, so as to solve the problem of failing to meet safety requirements.

According to a first aspect of the present disclosure, the present disclosure provides a switch control method based on a self-generating switch and a receiving end, which is applied to the self-generating switch, the self-generating switch comprising a processor, a memory, a key, a generator, a reset component, a rectification module, an energy storage module, a voltage output module, and a wireless communication module, the wireless communication module and the memory being electrically connected to the processor, an induction portion of the generator being electrically connected to the energy storage module via the rectification module, and the energy storage module being electrically connected to the wireless communication module, the processor and the memory via the voltage output module, the reset component being able to be transmitted with a moving portion of the generator, and the button also being able to be directly or indirectly transmitted with the moving portion of the generator;

the switch control method comprising:
if a control action of pressing down the button occurs, then the reset component deforming and generating a reset force to overcome the deformation, and the moving portion of the generator being directly or indirectly driven by the key, such that the generator generates a first induced voltage, and if the button undergoes a bouncing manipulation action, the reset component driving the moving portion of the generator under an action of the reset force, such that the generator generates a second induced voltage;
the rectification module storing first electric energy corresponding to the first induced voltage and/or second electric energy corresponding to the second induced voltage in the energy storage module; the energy storage module transmitting the stored electric energy to the voltage output module, and the voltage output module using the received electric energy to provide a required voltage to the processor, the memory and the wireless communication module so as to power on same;
after the processor, the memory and the wireless communication module are powered on, the processor generating and sending a corresponding current control message to the receiving end via the wireless communication module, and the current control message recording current manipulation information and the current verification identifier, such that the receiving end verifies whether a relationship between the current verification identifier in the current control message and the stored historical verification identifier matches a preset transformation rule of the current verification identifier, and executing a control event corresponding to current manipulation information when the relationship matches the transformation rule, the historical verification identifier being determined according to the verification identifier recorded in a control message or a pairing message sent to the receiving end by the self-generating switch previously; the current manipulation information characterizing at least one of: the self-generating switch; the button that the self-generating switch currently receives the manipulation; a manipulation action currently received by the button in the self-generating switch; and in one pressing manipulation action and one bouncing manipulation action which occur successively, with regard to at least one manipulation action therein, before, after or at the same time of generating and sending a corresponding current control message to the receiving end via the wireless communication module, the processor also reading the current verification identifier from the memory, changing and updating the current verification identifier from a first numerical value to a second numerical value according to a preset transformation rule, and writing back the updated current verification identifier to the memory before the electric energy stored in the energy storage module is exhausted, the first numerical value being different from the second numerical value.

According to a second aspect of the present disclosure, the present disclosure provides a self-generating switch, comprising a processor, a memory, a key, a generator, a reset component, a rectification module, an energy storage module, a voltage output module, and a wireless communication module, the wireless communication module and the memory being electrically connected to the processor, an induction portion of the generator being electrically connected to the energy storage module via the rectification module, and the energy storage module being electrically connected to the wireless communication module, the processor and the memory via the voltage output module, the reset component being able to be transmitted with a moving portion of the generator, and the button also being able to be directly or indirectly transmitted with the moving portion of the generator;

the reset component is configured such that if the pressing manipulation action of the button occurs, then the reset component deforms and generates a reset force to overcome the deformation; and if the bouncing manipulation action of the button occurs, the reset component drives the moving portion of the generator under an action of the reset force;

the generator is configured such that if the pressing manipulation action of the button occurs, then the moving portion of the generator is directly or indirectly driven by the button such that the induction portion of the generator generates a first induced voltage, and if the bouncing manipulation action of the button occurs, the moving portion of the generator is driven by the reset component such that the generator generates a second induction voltage;

the rectification module is configured for storing first electric energy corresponding to the first induced voltage and/or second electric energy corresponding to the second induced voltage in the energy storage module;

the energy storage module is configured for transmitting the stored electrical energy to the voltage output module;

the voltage output module is configured for using the received electric energy to provide a required voltage to the processor, the memory and the wireless communication module so as to power on same;

the processor is configured for, after the processor, the memory and the wireless communication module are powered on, generating and sending a corresponding current control message to the receiving end via the wireless communication module, and the current control message recording the current verification identifier and current manipulation information, such that the receiving end verifies whether a relationship between the current verification identifier and the stored historical verification identifier matches a preset transformation rule of the current verification identifier, and executing a control event corresponding to current manipulation information when the relationship matches the transformation rule, the historical verification identifier being determined according to the verification identifier recorded in a control message or a pairing message sent to the receiving end by the self-generating switch previously; the current manipulation information characterizing at least one of: the self-generating switch, the button that the self-generating switch currently receives the manipulation, a manipulation action currently occurring in the self-generating switch; the current manipulation information corresponding to at least one control event required to be executed by the receiving end; and in one pressing manipulation action and one bouncing manipulation action which occur successively, with regard to at least one manipulation action therein, before, after or at the same time of generating and sending a corresponding current control message to the receiving end via the wireless communication module, also reading the current verification identifier from the memory, changing and updating the current verification identifier from a first numerical value to a second numerical value according to a preset transformation rule, and writing back the updated current verification identifier to the memory before the electric energy stored in the energy storage module is exhausted, the first numerical value being different from the second numerical value.

According to a third aspect of the present disclosure, the present disclosure provides a receiving end control method based on a self-generating switch and a receiving end, applied to the receiving end, comprising:

receiving a current control message, the current control message being sent out by a self-generating switch via the switch control method involved in the first aspect and the option thereof or the self-generating switch involved in the second aspect and the option thereof;

verifying whether a relationship between the current verification identifier and the stored historical verification identifier matches the transformation rule; and executing a control event corresponding to the current manipulation information when the relationship matches the transformation rule.

In the switch control method, the receiving end control method, the self-generating switch and the receiving end provided in the present disclosure, by introducing a current verification identifier in an interaction process between the self-generating switch and the receiving end, whether the current verification identifier and a historical verification identifier matches a transformation rule can be used as a basis for executing a control event, so as to avoid executing a control event of a duplicate message, and the effect of preventing a duplicate attack is achieved. At the same time, the matching verification of whether the current verification identifier and the historical verification identifier match the transformation rule can also provide a basis for filtering out duplicate messages.

The duplicate message therein can be understood as: the attacker first grabs a valid switch message and then sends it out remaining it unchanged. With regard to this condition, the present disclosure realizes the transformation of a verification identifier, and at this time, the verification identifier in a real message is transformed, while the verification identifier in a duplicate message is usually repeated and unchanged. Furthermore, through verification based on a historical verification identifier and a transformation rule, the duplicate message can be effectively verified (wherein the relationship between the verification identifier and the historical verification identifier usually does not match the transformation rule), and then a control action of the duplicate message is avoided to ensure security.

BRIEF DESCRIPTION OF THE DRAWINGS

In order to explain the technical solutions in the embodiments of the present disclosure or in prior art more clearly, the following contents will briefly introduce the drawings which need to be used in the embodiments or in prior art. It would be obvious that the drawings in the following description are only embodiments of the present disclosure, and it is possible for a person skilled in the art to obtain other drawings according to these drawings provided without involving any inventive effort.

FIG. 15 is a schematic structural diagram I of a message according to an embodiment of the present disclosure;

FIG. 16 is a schematic structural diagram II of a message according to an embodiment of the present disclosure;

DETAILED DESCRIPTION OF THE INVENTION

The embodiments of the present disclosure will now be described more clearly and fully hereinafter with reference to the accompanying drawings, in which embodiments of the disclosure are shown. It is to be understood that the embodiments described are only a few, but not all embodiments of the disclosure. Based on the embodiments of the present disclosure, all other embodiments obtained by a person of ordinary skill in the art without inventive effort fall within the scope of the present disclosure.

The terms "first", "second", "third", "fourth", and the like (if present) in the description and in the claims, and in the above-described figures, are used for distinguishing between similar objects and not necessarily for describing a particular sequential or chronological order. It is to be understood that the data so used are interchangeable under appropriate circumstances such that the embodiments of the disclosure described herein are capable of operation in sequences other than those illustrated or otherwise described herein. Furthermore, the terms "comprising" and "having", as well as any variations thereof, are intended to cover a non-exclusive inclusion, such that a process, method, system, article, or device that comprises a list of steps or elements is not necessarily limited to those steps or elements expressly listed, but may include other steps or elements not expressly listed or inherent to such process, method, article, or device.

Hereinafter, the technical solution of the present disclosure will be described in detail with specific embodiments. The following specific embodiments may be combined with one another, and the same or similar concepts or processes may not be repeated in some embodiments.

Figure 1:
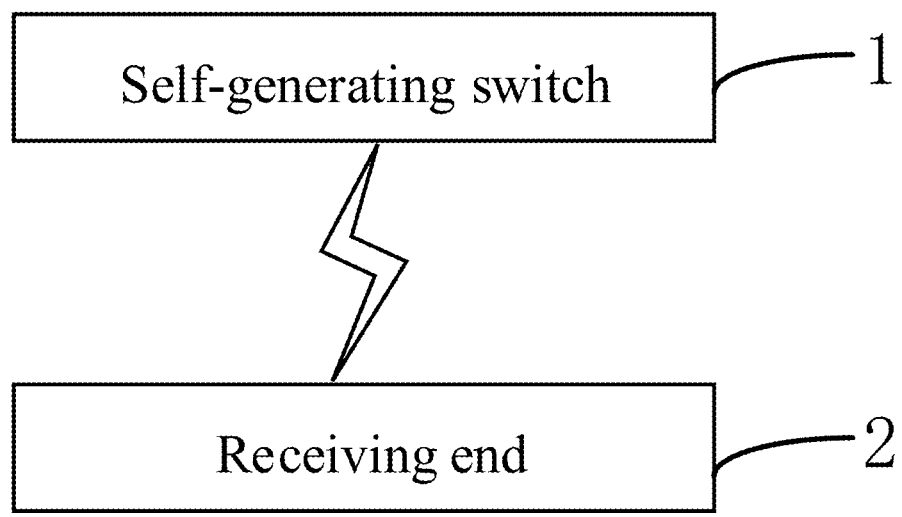
FIG. 1 is a schematic configuration diagram of a control system according to an embodiment of the present disclosure.

Referring to FIG. 1, a control system provided by an embodiment of the present disclosure may comprise a self-generating switch 1 and a receiving end 2, wherein one self-generating switch and one receiving end are shown in the figure. In an actual control system, the quantities of the self-generating switch(s) and the receiving end(s) may both be multiple, and at the same time, a wireless signal may be transmitted between the self-generating switch 1 and the receiving end 2, and the wireless signal may be Bluetooth, radio frequency, wifi, etc. for example.

The self-generating switch 1 is used for implementing the switch control method involved in the following text, and furthermore, the relevant description of the switch control method in the following text can be understood to be a description of an operating process, a function and a specific implementation of the software and/or hardware in the self-generating switch.

The receiving end 2 is used for implementing the receiving end control method involved in the following text, and furthermore, the relevant description of the receiving end control method in the following text can be understood to be a description of an operating process, a function and a specific implementation of the software and/or hardware in the receiving end.

The receiving end 2 can be any controlled device capable of being operated by the self-generating switch, or a device connected to the controlled device, and in particular examples, the receiving end 2 can be, for example, a wall switch, an electronic doorbell, a lamp, an automatic curtain, a fan, etc. Their accepted controls can be for example, but not limited to:

Controlling the receiving end or the device connected thereto to enter a certain state; for example, turning on or off a wall switch, turning on or off a lamp, pressing a door bell, controlling a fan to start or stop rotating, opening or closing an automatic curtain, opening or closing a designated function of a receiving end, etc.;

controlling a receiving end or a device connected thereto to switch between two states; for example, turning (switching) the switch state of the wall switch, turning (switching) the switch state of the lamp, turning (switching) the switch state of the fan, turning (switching) the switch state of the automatic curtain, turning (switching) the switch state of the function designated by the receiving end, etc.;

controlling a receiving end or a device connected thereto to change an operating parameter; for example, adjusting the brightness of the lamp, adjusting the amount of air of the fan, adjusting the opening degree of the curtain, etc.

Depending on the application field of the self-generating switch 1, the specific controlling and the controlled contents may be arbitrarily changed without departing from the scope of the embodiment of the present disclosure.

Meanwhile, the following description of the control event can be understood with reference to the foregoing contents.

Figure 2:
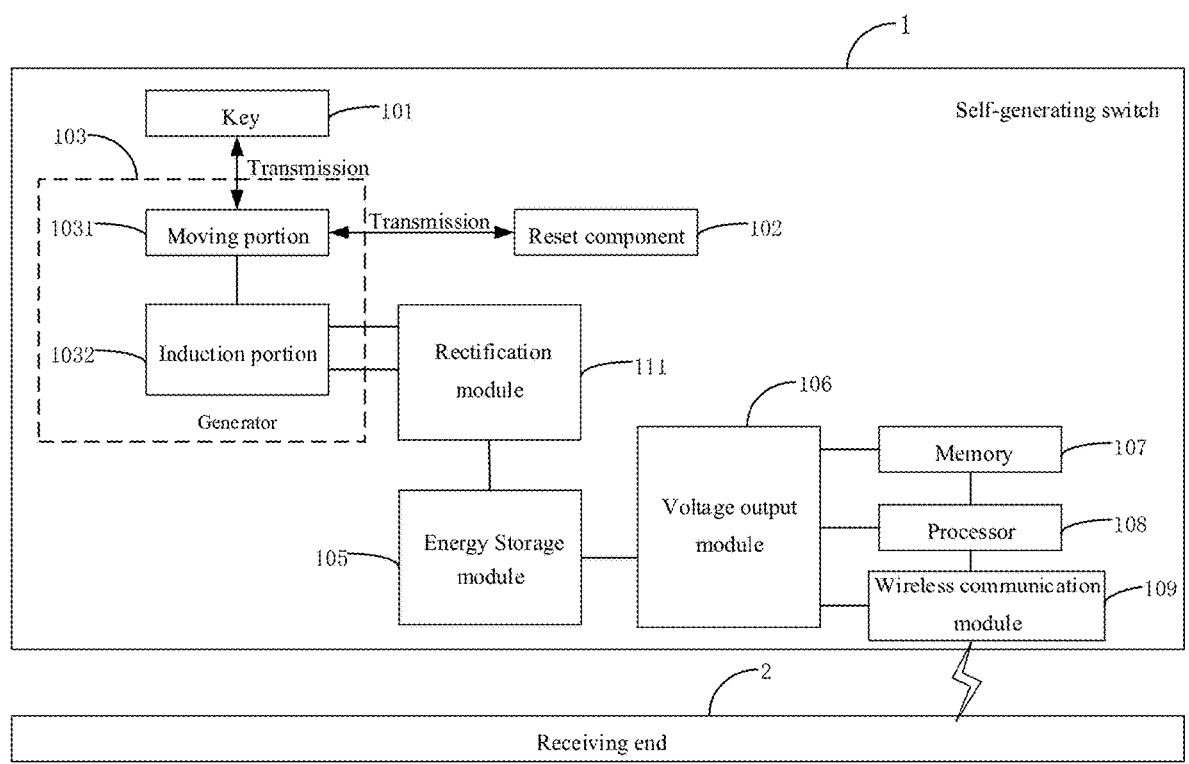
FIG. 2 is a schematic configuration diagram I of a self-generating switch according to an embodiment of the present disclosure.

In the embodiment of the present disclosure, referring to FIG. 2, the self-generating switch 1 includes a processor 108, a memory 107, a button 101, a generator 103, a reset component 102, a rectification module 111, an energy storage module 105, a voltage output module 106, and a wireless communication module 109.

The electrical connections referred to hereinafter may include direct electrical connections as well as indirect electrical connections.

The generator 103 is capable of generating electricity when the button 101 is operated (e.g. pressed and/or bounced), and generates electric energy, and the electric energy can be used for directly or indirectly supplying power to the processor 108, the wireless communication module 109 and the memory 107, etc. wherein the processor 108, the wireless communication module 109 and the memory 107 can be separate or integrated together, and furthermore. If the processor 108, the wireless communication module 109 and the memory 107 are integrated together, the power supply to the processor 108, the wireless communication module 109 and the memory 107 may be implemented on the same power supply side.

Here, the generator 103 may include a moving portion 1031 and an induction portion 1032.

The moving portion 1031 can be understood to be a component or a combination of components capable of being driven by at least one of a key, a reset component, etc. so as to move, and the induction portion 1032 can be understood to be a component or a combination of components capable of acting on the moving portion 1031 so as to be induced and generate electric power when the moving portion moves. Any structure capable of generating electric power based on movement in the art can be used as an alternative of the embodiment of the present disclosure.

In a specific example, the generator 103 may be provided with a permanent magnet portion, a magnetic conductive portion and a coil portion, and the coil portion may be provided at the magnetic conductive portion, and furthermore, when the permanent magnet portion and the magnetic conductive portion move relative to each other, the coil portion may generate an induced voltage. The coil portion may be regarded as the above-mentioned induction portion 1032, and the permanent magnet portion or the magnetic conductive portion may be regarded as the above-mentioned moving portion 1031, namely: in some examples, the permanent magnetic portion moves so as to be directly and indirectly transmitted with the button and the reset component, and in other examples, the magnetic conductive portion moves so as to be directly and indirectly transmitted with the button and the reset component. As can be seen, induction portion 1032 may or may not move with moving portion 1031.

The wireless communication module 109 and the memory 107 are electrically connected to the processor 108. The induction portion 1032 of the generator 103 is electrically connected to an energy storage module 105 via the rectification module 111. The energy storage module 105 is electrically connected to the wireless communication module 109 via the voltage output module 106. The processor 108 and the memory 107 (for example, being connected to a power supply end of the wireless communication module 109, the processor 108 and the memory 107), and the reset component 102 (for example, a torsion spring, an elastic sheet, a tension spring or the like) can be transmitted with the moving portion 1031 of the generator 103, and the button 101 can also be directly or indirectly transmitted with the moving portion 1031 of the generator.

In some implementations, the reset component 102 may be directly transmitted with the moving portion 1031, and in other implementations, the reset component 102 may be transmitted with the button or other component and thus be indirectly transmitted with the moving portion 1031.

Figure 11:
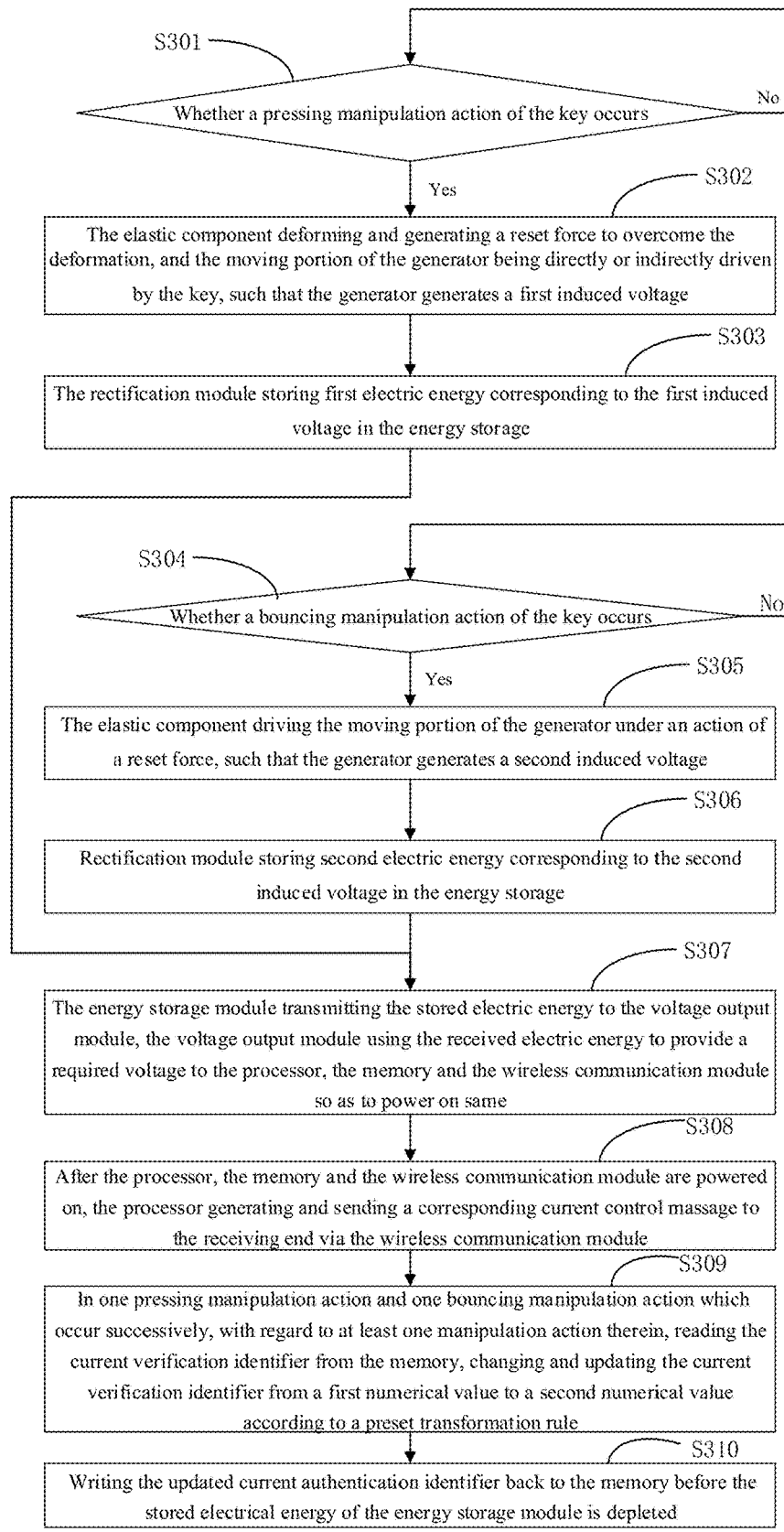
FIG. 11 is a schematic flowchart I of a switch control method according to an embodiment of the present disclosure.

With reference to FIG. 11, the switch control method includes:

S301: whether a pressing manipulation action of the button occurs;

if so, step S302 may be implemented: if a control action of pressing down the button occurs, then the reset component deforming and generating a reset force to overcome the deformation, and the moving portion of the generator being directly or indirectly driven by the key, such that the generator generates a first induced voltage;

If not, it may return to step S301 to continue to determine whether or not the pressing manipulation action has occurred.

In some versions, step S302 may be followed by: S303: the rectification module storing first electric energy corresponding to the first induced voltage in the energy storage module.

Referring to FIG. 11, the switch control method may also include:

S304: whether a bouncing manipulation action of the button occurs;

if so, step S305 may be implemented: the reset component driving the moving portion of the generator under an action of a reset force, such that the generator generates a second induced voltage;

in some versions, step S305 may be followed by: S306: the rectification module storing second electric energy corresponding to the second induced voltage in the energy storage module.

In particular examples, only the first electrical energy may be stored and/or used, and only the second electrical energy may be stored and/or used.

After step S303 and/or step S306, the method may include:

S307: the energy storage module transmitting the stored electric energy to the voltage output module, the voltage output module using the received electric energy to provide a required voltage to the processor, the memory and the wireless communication module so as to power on same; and S308: after the processor, the memory and the wireless communication module are powered on, the processor generating and sending a corresponding current control massage to the receiving end via the wireless communication module, the current control message recording current manipulation information and the current verification identifier, such that the receiving end verifies whether a relationship between the current verification identifier in the current control message and the stored historical verification identifier matches a preset transformation rule of the current verification identifier, and executing a control event corresponding to current manipulation information when the relationship matches the transformation rule, the historical verification identifier being determined according to the verification identifier recorded in a control message or a pairing message sent to the receiving end by the self-generating switch previously.

The current manipulation information characterizes at least one of: the self-generating switch; a button that the self-generating switch currently receives the manipulation; a manipulation action currently received by the button in the self-generating switch.

Before, after or at the same time when the processor generates and sends a corresponding current control message to the receiving end via the wireless communication module (namely, before, after or at the same time when step S308 is implemented), the method may further include:

S309: in one pressing manipulation action and one bouncing manipulation action which occur successively, with regard to at least one manipulation action therein, reading the current verification identifier from the memory, changing and updating the current verification identifier from a first numerical value to a second numerical value according to a preset transformation rule, wherein the first numerical value is different from the second numerical value.

It can be seen that since the pressing manipulation action and the bouncing manipulation action are in pairs and continuous, then bouncing will usually occur after pressing. Further, in the foregoing solution, the current authentication identifier may be updated only after the pressing manipulation action occurs, the current authentication identifier may be updated only after the bouncing manipulation action occurs, and the current authentication identifier may be updated both after the pressing manipulation action and after the bouncing manipulation action.

Referring to FIG. 11, the switch control method may further include:

S310: writing the updated current authentication identifier back to the memory before the stored electrical energy of the energy storage module is depleted.

Corresponding to the steps S301 to S310, the function of each component in the self-generating switch can be understood with reference to the following content.

the reset component 102 is configured such that if the pressing manipulation action of the button 101 occurs, then the reset component deforms and generates a reset force to overcome the deformation; and if the bouncing manipulation action of the button 101 occurs, the reset component drives the moving portion 1031 of the generator 103 under an action of the reset force. The generator 103 is configured such that if the pressing manipulation action of the button 101 occurs, then the moving portion 1031 of the generator 103 is directly or indirectly driven by the button 101 such that the induction portion 1031 of the generator 103 generates a first induced voltage, and if the bouncing manipulation action of the button 101 occurs, the moving portion 1031 of the generator 103 is driven by the reset component 102 such that the generator generates a second induction voltage;

the rectification module 111 is configured for storing first electric energy corresponding to the first induced voltage and/or second electric energy corresponding to the second induced voltage in the energy storage module;

the energy storage module 105 is configured for transmitting the stored electrical energy to the voltage output module 106;

the voltage output module 106 is configured for using the received electric energy (first energy and/or second energy) to provide a required voltage to the processor 108, the memory 107 and the wireless communication module 109 so as to power on same;

the processor 108 is configured for, after the processor 108, the memory 107 and the wireless communication module 109 are powered on, generating and sending a corresponding current control massage to the receiving end 2 via the wireless communication module 109; and in one pressing manipulation action and one bouncing manipulation action which occur successively, with regard to at least one manipulation action therein, before, after or at the same time of generating and sending a corresponding current control message to the receiving end via the wireless communication module, also reading the current verification identifier from the memory, changing and updating the current verification identifier from a first numerical value to a second numerical value according to a preset transformation rule, and writing back the updated current verification identifier to the memory before the electric energy stored in the energy storage module is exhausted, the first numerical value being different from the second numerical value.

If the self-generating switch is provided with a reset component, the pressing manipulation action may refer to the operation of pressing down the key, and the bouncing manipulation action may refer to the operation of removing the force of pressing down so as to bouncing the key.

In some examples, in a message (such as a current control message or a pairing message), at least two of information characterizing the self-generating switch, information characterizing the key, and information characterizing the manipulation action can be configured as an integrated piece of information. For example, a pre-defined character string can be configured corresponding to each manipulation action of each key, such that the character string is used as (or characterizes) the current manipulation information, and furthermore, by reading the character string, the receiving end can learn which button has what manipulation action.

In other examples, corresponding characters or character strings may be respectively configured for the information characterizing the self-generating switch, the information characterizing the key, and the information characterizing the manipulation action, respectively, as the current manipulation information.

The information characterizing the self-generating switch may be information characterizing which self-generating switch it is, or may be information characterizing which kind of self-generating switch it is (e.g. at least one of a model, lot, brand, etc. of the self-generating switch).

In a specific example, the current manipulation information may include a switch identifier, and the switch identifier may be used to characterize the self-generating switch, and the current manipulation information may further include a button value, and the button value may be used to characterize the button on which the self-generating switch currently receives the manipulation, and the manipulation action that the button in the self-generating switch currently receives.

In addition, the current manipulation information can be understood as information from which the receiving end can determine a control event, and furthermore, if the information characterizing the self-generating switch (or the information characterizing the button or the manipulation action) is not used to determine the control event, then even if this information is written into a message, it may not be treated as current manipulation information.

The verification identifier therein can be any character or combination of characters which can be suitable for realizing verification. The current verification identifier can be understood to be currently issued by the self-generating switch, and the historical verification identifier can be understood to have been stored at the receiving end before the self-generating switch is issued.

In some examples, the historical verification identifier may be the current verification identifier sent to the receiving end (sent with the control message or the pairing message) and stored by the receiving end since the last occurrence of the manipulation action of the self-generating switch, or determined according thereto; in other examples, the historical verification identifier may also be the current verification identifier sent to the receiving end (sent with the control message or the pairing message) and stored by the receiving end since the last occurrence of the specific manipulation action of the self-generating switch (for example, the pressing manipulation action or the bouncing manipulation action), or determined according thereto.

Since the verification identifier is a specific numerical value, it can also be described as a sequence number, and furthermore, in the examples of embodiments of the present disclosure, the description of the sequence number can be considered as the description of the verification identifier.

The wireless communication module 109 therein can be any circuit module capable of realizing wireless communication, and for example, can include at least one of the following: a radio frequency module, a bluetooth module, a wifi module, etc.

Figure 18:
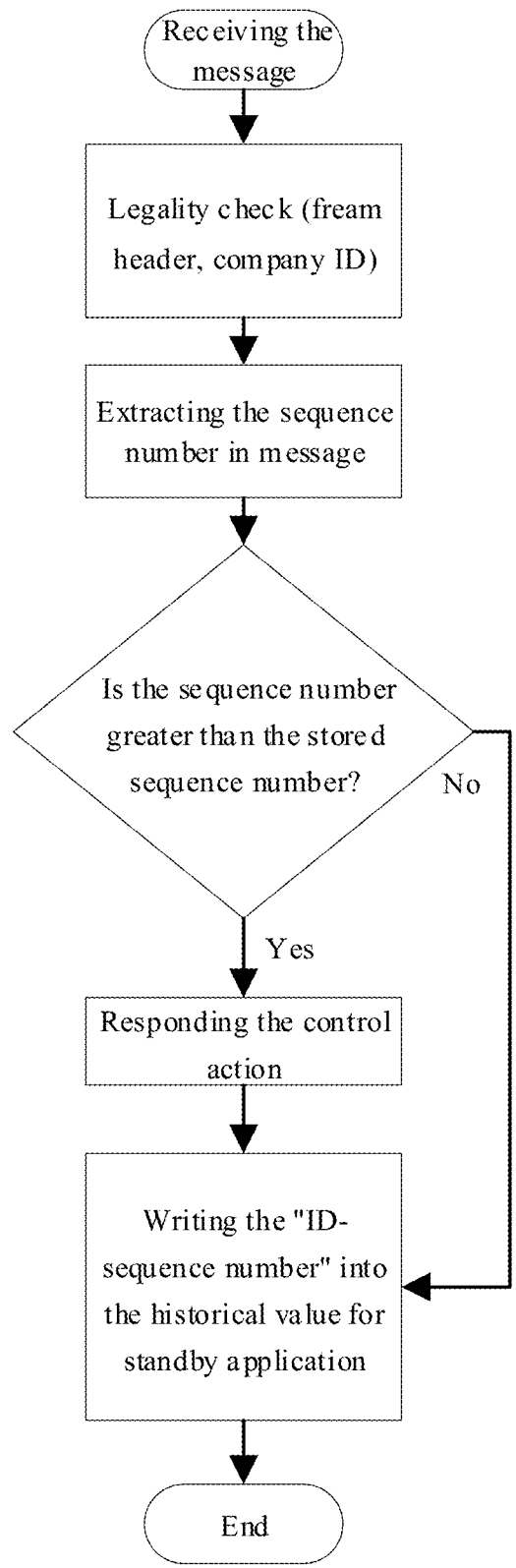
FIG. 18 is a schematic flowchart I illustrating operation of the receiving end according to an embodiment of the present disclosure.

Corresponding to the above-mentioned steps S301 to S310 and the corresponding functions of each component of the self-generating switch, referring to FIG. 18, a receiving end control method may include:

S401: receiving a current control message,
the current control message being sent out by a self-generating switch via the switch control method described above and the option thereof or the self-generating switch described above;

S402: verifying whether a relationship between the current verification identifier and the stored historical verification identifier matches the transformation rule; and S403: executing a control event corresponding to the current manipulation information when the relationship matches the transformation rule.

If the relationship does not match the transformation rule, a corresponding message (for example, a current control message) can be discarded; the discarding of the current control message can be understood as not processing on the basis of the current control message, for example, neither executing a control event corresponding to the current control message, nor updating and changing information such as the historical verification identifier based on the current control message.

In the foregoing solution, in the switch control method, the receiving end control method, the self-generating switch and the receiving end provided in the present disclosure, by introducing a current verification identifier in an interaction process between the self-generating switch and the receiving end, a matching verification of the current verification identifier and a historical verification identifier can be used as a basis for executing a control event, so as to avoid executing a control event of a duplicate message, and the effect of preventing a duplicate attack is achieved. At the same time, the matching verification of whether the current verification identifier and the historical verification identifier match the transformation rule can also provide a basis for filtering out duplicate messages.

The verification identifier in a real message is transformed, while the verification identifier in a duplicate message is usually repeated. Furthermore, through verification based on a historical verification identifier and a transformation rule, the duplicate message can be effectively verified (wherein the relationship between the verification identifier and the historical verification identifier usually does not match the transformation rule), and then a control action of the duplicate message is avoided to ensure security.

In addition, when the historical verification identifier is the past current verification identifier, it can be guaranteed that the origin of verification identifier is derived from the self-generating switch, which can effectively ensure the accuracy and safety of verification.

Figure 3:
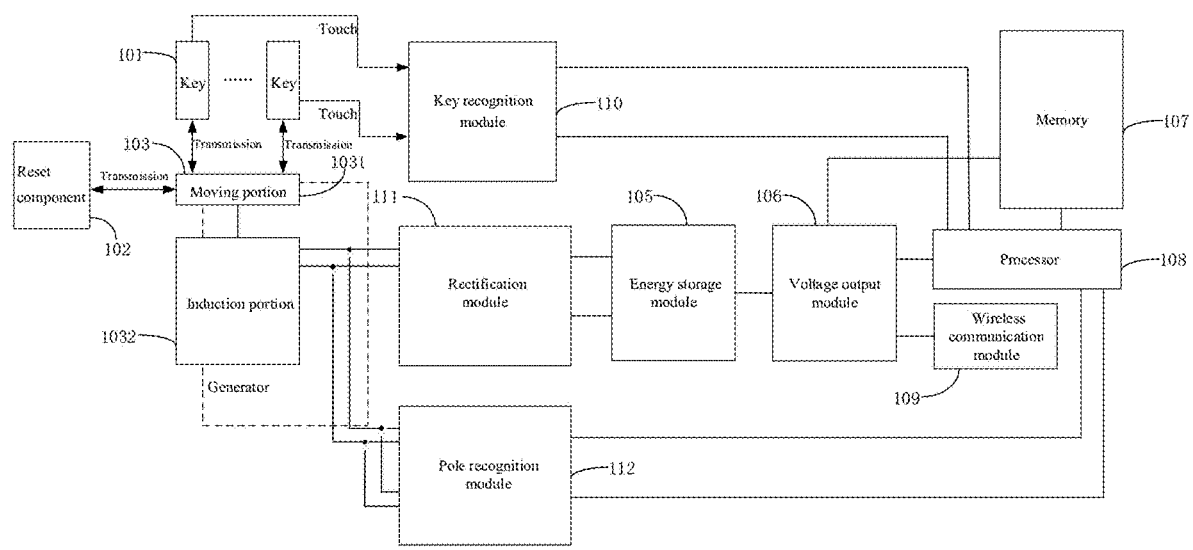
FIG. 3 is a schematic configuration diagram II of a self-generating switch according to an embodiment of the present disclosure.
Figure 4:
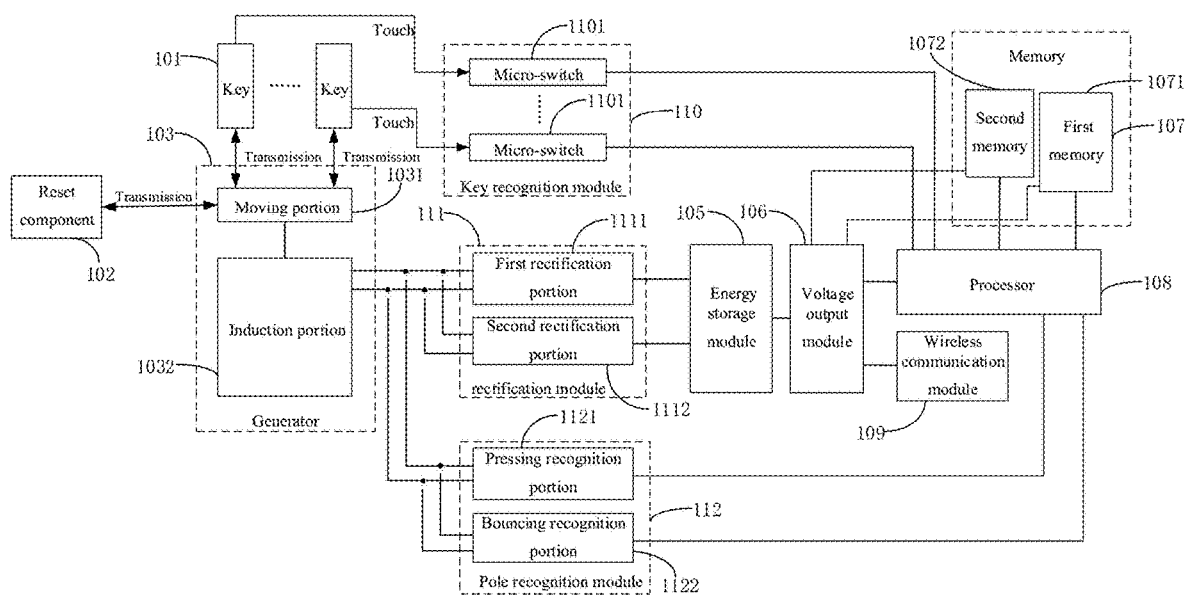
FIG. 4 is a schematic configuration diagram III of a self-generating switch according to an embodiment of the present disclosure.

In one embodiment, referring to FIGS. 3 and 4, the self-generating switch 1 further includes a polarity recognition module 110. The polarity recognition module 110 is electrically connected to the generator 103 (e.g. its induction portion 1032) and the processor 108.

before the processor reads a current verification identifier from the memory and updates the current verification identifier, the switch control method further includes that:

after the processor, the memory and the wireless communication module are powered on, the processor recognizes, via the polarity recognition module, the currently occurring manipulation action of the key, and determines that the currently occurring manipulation action is the target manipulation action (namely, the processor 108 is further used to recognizes a currently occurring manipulation action of the button via the polarity recognition module 110, and determines the currently occurring manipulation action as the target manipulation action, the target manipulation action being specified by selecting one of the pressing manipulation action and the bouncing manipulation action.

It can be seen that in the above-mentioned solution, the scheme of "the transformation of the authentication identifier occurs only after one complete pressing and bouncing" is implemented. Since there is a possibility of packet loss in wireless communication, if the data packet sent by pressing (namely, the data packet of the control message sent after pressing) is lost, the data packet sent by bouncing (namely, the data packet of the control message sent after bouncing) can be used as a remedy, and the receiving end can perform a response action after receiving the bouncing data packet.

With regard to this, a receiving end can determine whether to execute a control event by combining a verification identifier and a manipulation action characterized by the control message. For example, the receiving end can determine according to a sequence number (namely, a verification identifier), and if it is a pressing data packet (namely, the current manipulation information is pressing manipulation information), a response must be made so as to execute a corresponding control event. If it is a bouncing data packet (namely, the current manipulation information is bouncing manipulation information), response is made to execute a corresponding control event only if a pressing data packet of the same sequence number (namely, the verification identifier) has not been received before.

It can be seen that if the control events corresponding to pressing and bouncing are the same, then the solution that "the transformation of the verification identifier occurs only after one complete pressing and bouncing" can help to avoid the data packet loss affecting the execution of the control event, ensuring that the corresponding control event can be effectively executed.

At the same time, after a reasonable configuration is performed on a receiving end, it can also help to avoid control messages directed to the same control event being repeatedly executed. For example, when the self-generating switch is used to control a lamp (namely, the receiver is a lamp or is connected to a lamp), if the controlled control event is as follows: if the lamp state is reversed, then if both the pressing and the bouncing are responded, the lamp is turned on when the pressing is performed and then turned off after the bouncing. The reasonable configuration can be as follows: if the self-generating switch changes the current authentication identifier when pressing is performed, then the receiving end may update and write the current authentication identifier therein as a new historical authentication identifier when the control message is received.

While the above-mentioned effects can be achieved simultaneously, even if the control events corresponding to pressing and bouncing are different in some receiving ends, the realization of different control events can be ensured after reasonable configuration of the receiving ends. The reasonable configuration can be as follows: if the self-generating switch changes the current authentication identifier when pressing is performed, then the receiving end may update and write the authentication identifier therein as a new historical authentication identifier when the control message at the time of bouncing is received.

It can be seen that using the same set of update conditions of a verification identifier (namely, changing the current verification identifier only when the current manipulation occurring is the target manipulation action) can not only satisfy the requirements of the receiving end of which the pressing and bouncing correspond to the same control event, but also can take into account the requirements of the receiving end of which the pressing and bouncing correspond to different control events. Furthermore, the compatibility of the self-generating switch with various possible control requirements is effectively ensured, thereby improving the diversity of the control achieved by the control system.

Furthermore, the scheme of "the transformation of the authentication identifier occurs only after one complete pressing and bouncing" can also serve to save electrical energy. For example, if the sequence number is only updated at the time of bouncing (i.e. current verification identifier), when pressing occurs, there is no need to update the sequence number (i.e. the current authentication identifier), and in particular, the energy consumption of writing the updated sequence number into the memory can be saved.

In addition, when the sequence numbers corresponding to the pressing manipulation action and the bouncing manipulation action are the same, the receiving end can also be made simpler to perform packet deduplication according to the sequence numbers. (namely, the current verification identifier)

In a further example, the target manipulation action is a bouncing manipulation action, and in other examples, the target manipulation action may be a pressing manipulation action.

When the user presses the button of the self-generating switch, it is generally desirable to obtain feedback of the control effect immediately. Furthermore, if the sequence number is updated only upon bouncing (i.e. the target manipulation action is the bouncing manipulation action), then all the power at the time of pressing can be used for other tasks, in particular for sending a signal, without consuming power for updating the sequence number.

In one embodiment, referring to FIG. 3, the self-generating switch 1 further includes a button recognition module 110, wherein the button recognition module 110 is electrically connected to the processor.

Figure 12:
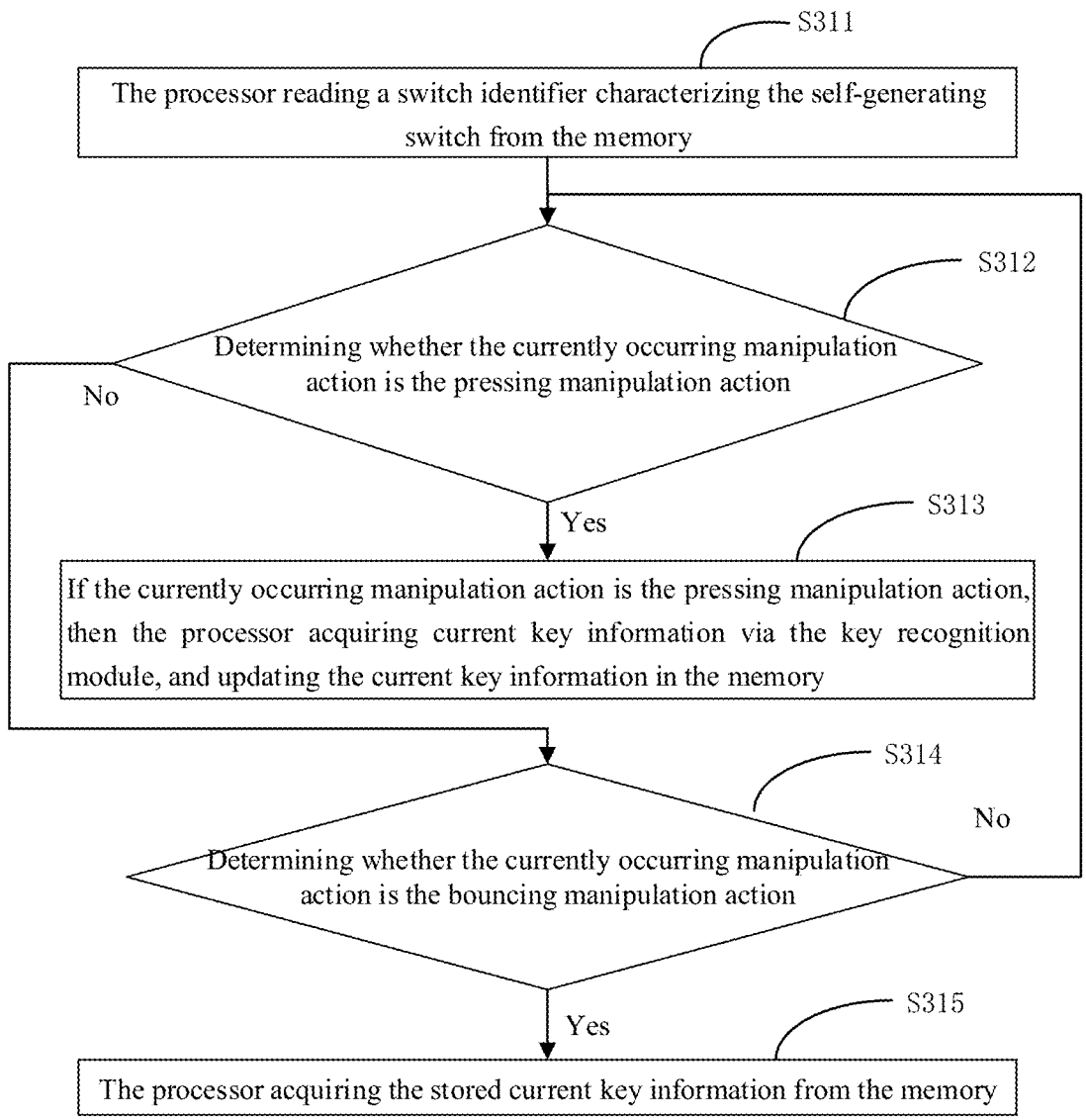
FIG. 12 is a schematic flowchart II of a switch control method according to an embodiment of the present disclosure.

Referring to FIG. 12, before the processor generates a current control message, the switch control method further includes:

S311: the processor reading a switch identifier characterizing the self-generating switch from the memory;

S312: determining whether the currently occurring manipulation action is the pressing manipulation action;

if the determination result in step S312 is YES, step S313 may be implemented as follows: if the currently occurring manipulation action is the pressing manipulation action, then the processor acquiring current button information via the button recognition module, and updating the current button information in the memory;

if the determination result in step S312 is NO, step S314 may be implemented as follows:

determining whether the currently occurring manipulation action is the bouncing manipulation action;

if the determination result in step S314 is YES, step S315 may be implemented as follows: the processor acquiring the stored current button information from the memory; and if the determination result in step S314 is NO, the process may return to step S312.

Based on the above-mentioned switch identifier and manipulation action information, the current manipulation information is determined based on the switch identifier, the manipulation action information and the acquired current button information.

Accordingly, before generating the current control message, the processor 108 can also be used for:

reading a switch identifier characterizing the self-generating switch from the memory;

if the currently occurring manipulation action is the pressing manipulation action, acquiring current button information via the button recognition module, and updating the current button information in the memory;

if the currently occurring manipulation action is the bouncing manipulation action, acquiring the stored current button information from the memory; and the current manipulation information being determined based on the switch identifier, the currently occurring manipulation action, and the acquired current button information, wherein for example, the switch identifier can be written into the current control message, and a button value can also be determined on the basis of the manipulation action and the current button information, and the button value is written into the current control message.

In a further example, referring to FIG. 4, the button recognition module 110 may include a micro-switch 1101, wherein the number of the micro-switch 1101 and the keys 101 may be one as shown in FIG. 2 or multiple as shown in FIG. 3 and FIG. 4. Each micro-switch 1101 corresponds to each button 101 on a one-to-one basis. The micro-switch 1101 can be touched when the corresponding button is pressed, and then a signal is fed back to the processor 108. At this time, the processor 108 can read the fed-back signal to determine button information characterizing the key, so as to learn which button is the button currently pressed.

Figure 6:
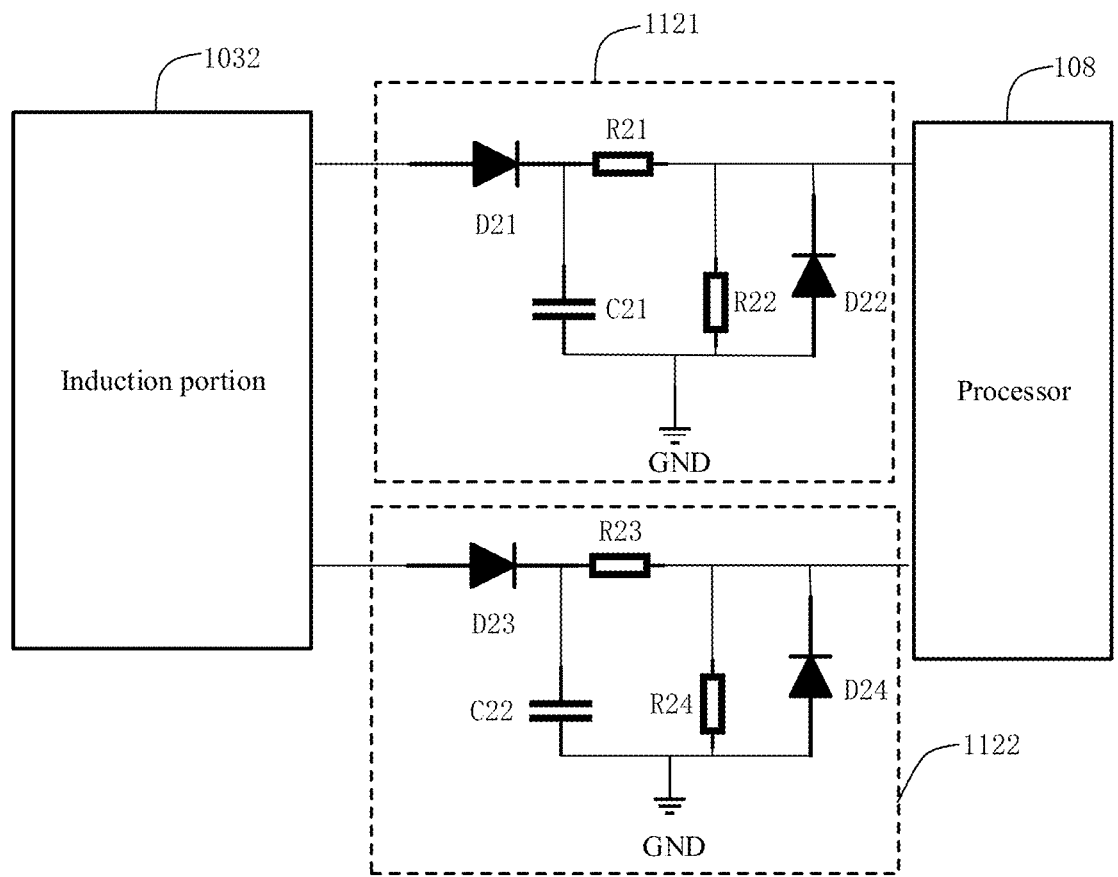
FIG. 6 is a schematic circuit diagram of a polarity recognition module according to an embodiment of the present disclosure.

In one embodiment, referring to FIG. 4 and FIG. 6, the polarity recognition module 112 includes a pressing recognition portion 1121 and a bouncing recognition portion 1122; the pressing recognition portion 1121 is electrically connected to an induction portion 1032 of the generator 103 and the processor 108, respectively, and the bouncing recognition portion 1122 is electrically connected to the induction portion 1032 of the generator 103 and the processor, respectively 108. The processor recognizes a currently occurring manipulation action on the button via the polarity recognition module including:

if the processor receives a specified signal sent by the pressing recognition portion, determining that the currently occurring manipulation action is the pressing manipulation action; the pressing recognition portion transmitting the specified signal to the processor only when the generator generates the first induced voltage; and if the processor receives the specified signal sent by the bouncing recognition portion, determining that the currently occurring manipulation action is the pressing manipulation action, the bouncing recognition portion sending the specified signal to the processor only when the generator generates the second induced voltage.

Accordingly, when the processor 108 recognizes the current manipulation action of the button via the polarity recognition module, the processor is specifically used for:

if the processor receives a specified signal sent by the pressing recognition portion 1121, determining that the currently occurring manipulation action is the pressing manipulation action; the pressing recognition portion 1121 transmitting the specified signal to the processor 108 only when the generator 103 generates the first induced voltage; and if the processor receives the specified signal sent by the bouncing recognition portion 1122, determining that the currently occurring manipulation action is the pressing manipulation action, the bouncing recognition portion 1122 sending the specified signal to the processor 108 only when the generator 103 generates the second induced voltage.

The designation signal may, for example, be any one of high level signal, high pulse signal, low level signal and low pulse signal.

Figure 7:
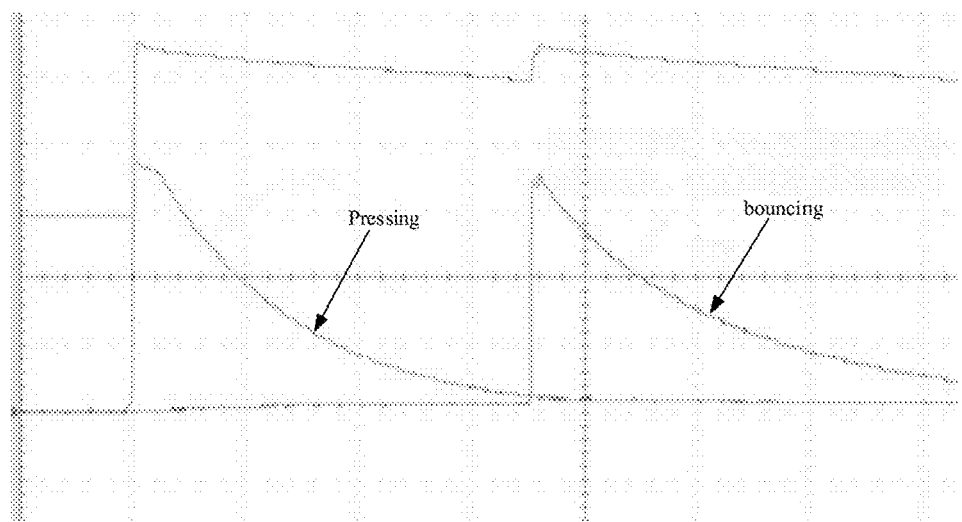
FIG. 7 is a schematic waveform diagram of a pulse signal output from an induction portion according to an embodiment of the present disclosure.

The pulse signal from the induction portion during pressing and the pulse signal from the induction portion during bouncing can be understood with reference to the waveforms shown in FIG. 7. In FIG. 7, the abscissa is time and the ordinate is voltage.

By way of further example, referring to FIG. 6, the pressing recognition portion 1121 may include:

pressing recognition first diode D21, pressing recognition second diode D22, pressing recognition first resistor R21, pressing recognition second resistor R22, and pressing recognition capacitor C21.

A positive electrode of the pressing recognition first diode D21 is electrically connected to a first output end of the induction portion, a negative electrode of the pressing recognition first diode D21 is respectively electrically connected to a first end of the pressing recognition capacitor C21, and a first end of the pressing recognition first resistor R21 and a second end of the pressing recognition capacitor C21 are grounded, a first end of the pressing recognition second resistor R22 and a negative electrode of the pressing recognition second diode D22 are electrically connected to a first receiving end (such as an I/O port) of the processor 108, a positive electrode of the pressing recognition second diode D22 and a second end of the pressing recognition second resistor R22 are grounded.

By way of further example, referring to FIG. 6, the bouncing recognition portion 1122 may include a bouncing recognition first diode D23, a bouncing recognition second diode D24, a bouncing recognition first resistor R23, a bouncing recognition second resistor R24, and a bouncing recognition capacitor C22.

The positive electrode of the bouncing recognition first diode D23 is electrically connected to the second output end of the induction portion; the negative electrode of the bouncing recognition first diode D23 is respectively electrically connected to the first end of the bouncing recognition capacitor C22 and the first end of the bouncing recognition first resistor R23 and the second end of the bouncing recognition capacitor C22 are grounded, and the first end of the bouncing recognition second resistor R24, the negative end of the bouncing recognition second diode D24 are electrically connected to the second receiving end (such as an I/O port) of the processor 108, the positive electrode of the bouncing recognition second diode D24 and the second end of the bouncing recognition second resistor R24 are grounded.

When the generator is pressed or bounced, the output may generate a positive pulse, respectively. The energy storage capacitor corresponding to the positive pulse (namely, the pressing recognition capacitor C21 or the bouncing recognition capacitor C22) will be charged, and then a positive pulse is output to the receiving end of the processor. The capacitor corresponding to the negative pulse of the generator will not be charged, and the capacitor corresponding to the positive pulse will not flow to the capacitor corresponding to the negative pulse due to the presence of the diode, so the capacitor corresponding to the negative pulse will not output a pulse signal or a high-level signal to the processor. The processor may detect the level generated by the resistor divider to perform a corresponding action.

Here, the pressing recognition first diode D21 and the bouncing recognition first diode D23 may be an isolated diode. For example, a type RB551V diode may be used. Pressing recognition second diode D22 and bouncing recognition second diode D24 can be used as a voltage-stabilizing diode. For example, a voltage-stabilizing diode of 3.3V can be used, and a voltage-stabilizing diode of MMSZ5226 BS can be specifically selected, with a maximum power consumption of 200 mW and a reverse leakage current of 25 μA.

According to the selection of the resistance value of the voltage divider, the maximum voltage of the generator needs to reach U=3.5*5/2=8.75 V to reach the maximum withstand voltage of the IO port of 3.5V, and the generator can generally meet this requirement.

In an embodiment of the present disclosure, only the pressing recognition portion may be used, or only the bouncing recognition portion may be used. For example, if the time for transmitting a message from the self-generating switch is very short, and the sending is completed soon after each pressing and the amount of power is exhausted, the switch may only need one recognition portion (for example, a pressing recognition portion or a bouncing recognition portion). For example, when there is only one pressing recognition portion, a high level is generated when the switch is pressed, whereby the processor recognizes that it is pressing. When the switch bounces, the processor does not detect a high level, which can also be considered as bouncing.

However, with regard to some self-generating switches (for example, a self-generating switch using a Bluetooth module for a wireless communication module), since the duration of each transmission is long, it is possible that when a user releases the switch, the pressing message has not been transmitted completely, and at this time the processor is still in an operating state, and if no bouncing recognition portion outputs a high level, the processor does not know that the switch bounces. Thus, two separate recognition portions are required to identify pressing and bouncing such that a processor detects the presence of a high level or positive pulse at the corresponding IO port and considers that a corresponding pressing or bouncing has occurred. It can be seen that in this solution, it is possible to determine whether it is pressing or bouncing not only at the instant of "power on" to detect the IO port of polarity recognition.

In one embodiment, referring to FIG. 4, the memory 107 includes a first memory 1071 and a second memory 1072, and the current authentication identifier is updated and stored in the first memory 1071; the first memory 1071 and the second memory 1072 storing a program are different memories, and the first memory 1071 is a memory which does not lose data after a power failure.

The current verification identifier updated and stored in the first memory 1071 is the same as the current verification identifier recorded in the current manipulation message.

In a further aspect, the first memory 1071 is a memory capable of erasing, writing and reading data in units of one or more bytes, and writing and reading time of a single byte does not exceed 10 ms and consumed energy does not exceed 300 μJ. For example, the first memory 1071 includes a Flash memory and/or a ferroelectric memory.

Furthermore, the first memory further stores current button information, the current button information characterizing a button on which the self-generating switch has performed pressing action most recently; the keys characterized by the current button information are the same as the keys characterized by the current manipulation information.

Here, the first memory 1071 may not select the conventional FLASH because the conventional FALSH must be erased (written) in units of sectors, resulting in too much power required for its writing and the generator may not be able to support. On the contrary, when EEPROM, ferroelectric memory and the like are selected, it can effectively avoid the situation that the electric quantity of the generator is difficult to support.

Figure 8:
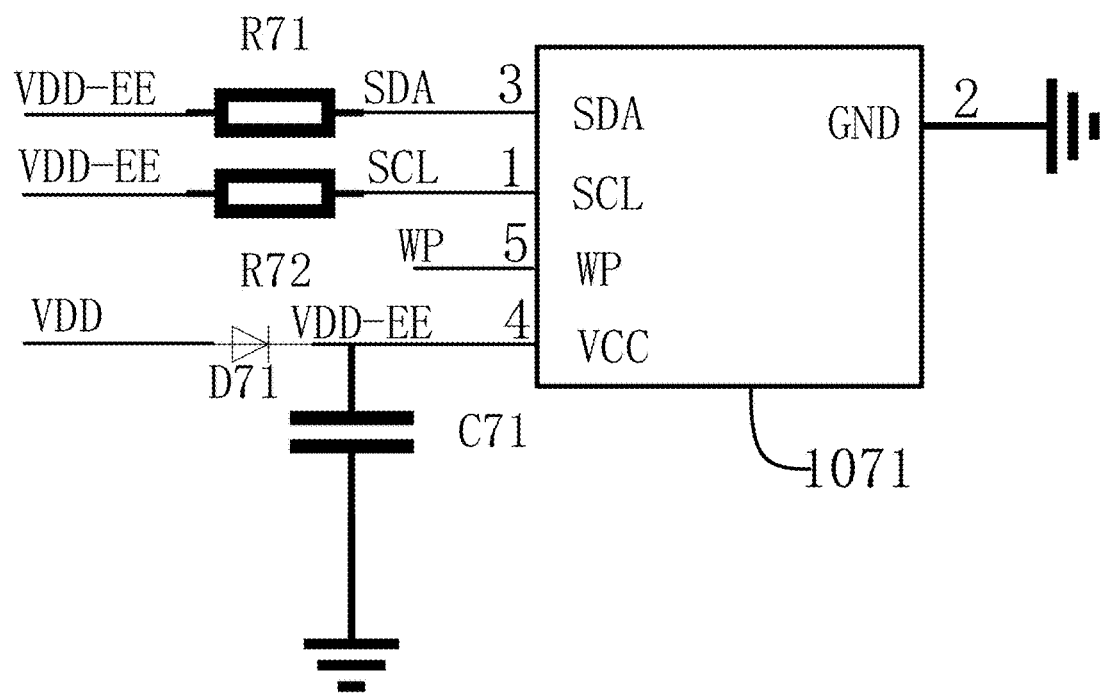
FIG. 8 is a schematic connection diagram of a first memory according to an embodiment of the present disclosure.
Figure 9:
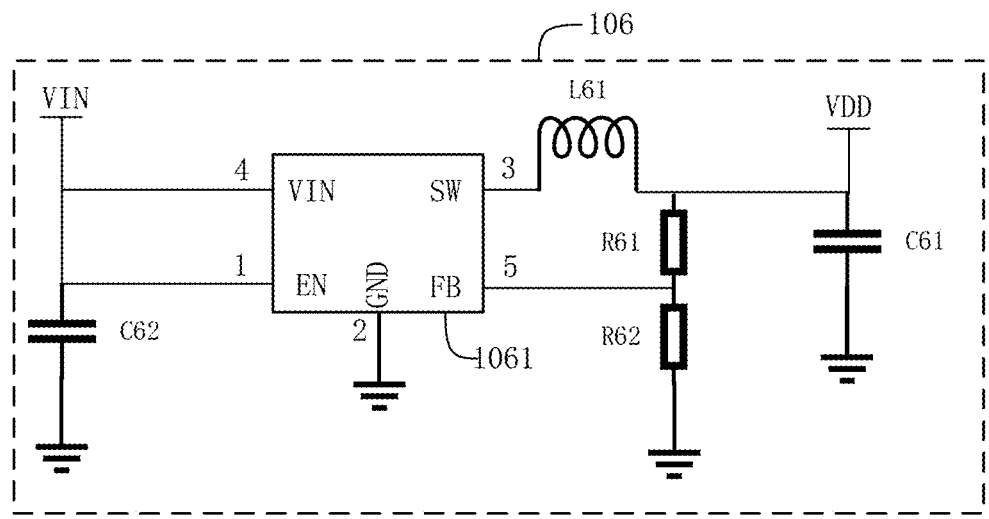
FIG. 9 is a schematic circuit diagram I of a voltage output module according to an embodiment of the present disclosure.
Figure 10:
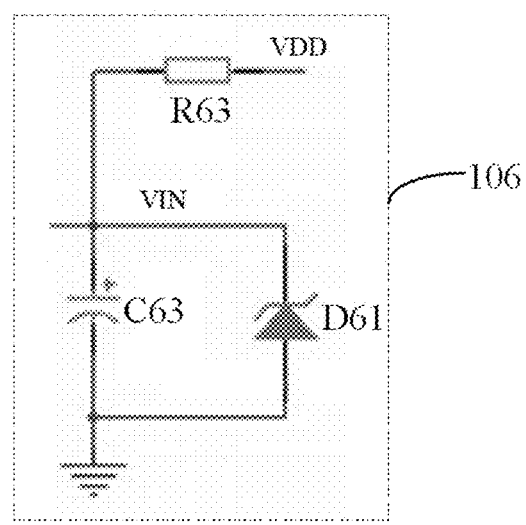
FIG. 10 is a schematic circuit diagram II of a voltage output module according to an embodiment of the present disclosure.

In a specific example, the first memory 1071 may be coupled to the processor through a IIC bus using 24C02. Taking FIG. 8 as an example, the power supply (VDD-EE) of the first memory 1071 is isolated from the power supply VDD of the processor by means of a diode D71, such that the processor 108 is in an unpowered state when necessary, e.g. when burning data into the EEPROM during the production phase, such that the IIC communication of the EEPROM with the burning tool is not affected by the IIC pin of the processing unit.

For specifically storing are: (1) current verification identifier; (2) current button information.

In operation, when the switch is pressed, the verification identifier can be read from the first memory first, and then updated (for example, a self-increasing operation), and the updated current verification identifier is filled into a message to be sent, and then the self-updated current verification identifier is rewritten back to the first memory, and then the power will be exhausted, and both the processor and the memory will "power down" and die.

When the switch is pressed and/or bounced, the current button information is sent (characterizing which button is pressed and released). However, due to the structural limitation of the self-generating switch, although the generator generates power when the switch is released, the micro-switch for detecting the button position has been released, and it cannot thus identify which button is acting. Therefore, a first memory (namely, using two memories) is provided, and when the switch is pressed, the current button information at this moment is written into the first memory. When bouncing occurs, although the current button information cannot be read from the state of the micro-switch, the previous button information can be read from the first memory as the current button information, such that the message at the time of bouncing also carries the button value, thereby doubling the probability that the receiving end can receive the message and improving the reliability.

In addition, the SCL terminal of the first memory 1071 may be connected to the VDD-EE of the processor via a resistor R72, and the SDA terminal of the first memory 1071 may be connected to the VDD-EE of the processor via a resistor R71.

Figure 5:
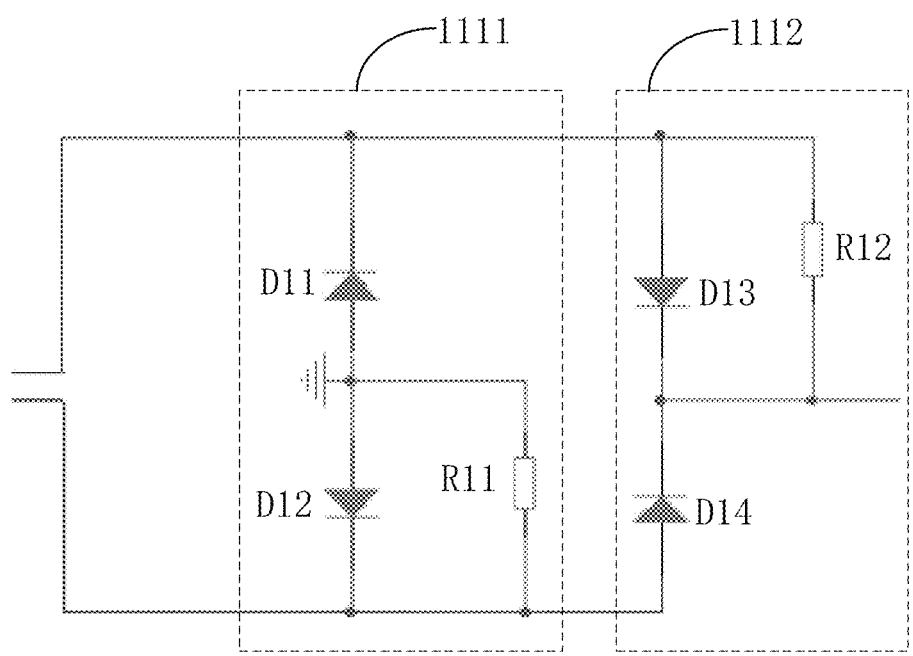
FIG. 5 is a schematic circuit diagram of a rectification module according to an embodiment of the present disclosure.

In one embodiment, referring to FIGS. 4 and 5, the rectification module 111 includes a first rectification portion 1111 and a second rectification portion 1112. The first rectification portion 1111 is electrically connected to the induction portion 1032 of the generator 103 and the energy storage module 105, and the second rectification portion 1112 is electrically connected to the induction portion 1032 of the generator 103 and the energy storage module 105.

The rectification module storing first electric energy corresponding to the first induced voltage and second electric energy corresponding to the second induced voltage in the energy storage module includes:

the first rectification portion rectifying the first induced voltage and storing corresponding first electrical energy in the energy storage module; and the second rectification portion rectifying the second induced voltage and storing corresponding second electric energy in the energy storage module.

Accordingly, the rectification module 111 is configured for storing first electric energy corresponding to the first induced voltage and second electric energy corresponding to the second induced voltage in the energy storage module, specifically the first rectification portion 111 rectifying the first induced voltage and storing corresponding first electrical energy in the energy storage module; and the second rectification portion 1112 rectifying the second induced voltage and storing corresponding second electric energy in the energy storage module.

In a further example, referring to FIG. 5, the first rectification portion 1111 includes a first rectification diode D11, a second rectification diode D12, and a first rectification resistor R11, and the second rectification portion 1112 includes a third rectification diode D13, a fourth rectification diode D14, and a first rectification resistor R12.

The negative electrode of the first rectification diode D11 and the negative electrode of the second rectification diode D12 can be respectively electrically connected to the first output end and the second output end of the induction portion, the positive electrode of the first rectification diode D11 and the positive electrode of the second rectification diode D12 can be grounded, and at the same time can also be connected to the first end of the first rectification resistor R11, and the second end of the first rectification resistor R11 is connected to the second output end.

The positive electrode of the third rectification diode D13 and the positive electrode of the fourth rectification diode D14 can be respectively electrically connected to the first output end and the second output end of the induction portion, the negative electrode of the third rectification diode D13 and the negative electrode of the fourth rectification diode D14 can be grounded, and at the same time can also be connected to the first end of the second rectification resistor R12, and the second end of the second rectification resistor R12 is connected to the first output end.

In the above-mentioned solution, the third rectification diode D13 and the fourth rectification diode D14 constitute the rectification portion of a positive pulse, and the first rectification diode D11 and the second rectification diode D12 constitute the rectification portion of a negative pulse. In this way, when the generator is pressed down and reset, electric energy can be transmitted to the energy storage module 105 via the rectification device, and a signal can be sent when the wireless switch is pressed down and reset.

In one embodiment, the voltage output module 106 may include: a controller 1061, an energy storage capacitor C61 and a freewheeling unit (for example, comprising a freewheeling inductor L61).

An input side of the controller 1061 is electrically connected to the energy storage module. At the same time, an enable end of the controller 1061 can be connected to the energy storage module and a first end of a capacitor C62, and a second end of the capacitor C62 can be grounded. An output side of the controller 1061 is electrically connected to a first end of the freewheeling unit (for example, a freewheeling inductor L61), and a second end of the freewheeling unit (for example, a freewheeling inductor L61) is directly or indirectly electrically connected to at least one of the processor and a wireless communication module memory. The energy storage capacitor C61 is electrically connected between a second end of the freewheeling unit (for example, a freewheeling inductor L61) and ground. The controller 1061 is configured to be capable of controlling turn-on and turn-off between an input side and an output side thereof, and adjusting a voltage output through the freewheeling unit and the energy storage capacitor by adjusting a switching frequency of turn-on and turn-off, and a duration of turn-on or turn-off.

The voltage output module 106 may further include a first feedback resistor R61 and a second feedback resistor R62 for detecting an output voltage and feeding same back into the controller 1061.

The controller 1061 can be integrated with a PWM generation unit to regulate the width or frequency of the output pulse according to the feedback voltage, control the internal or external switch tube to intermittently charge the output inductor so as to achieve the purpose of stabilizing voltage.

In some examples, a resistor R63 may be provided between the output end of the energy storage module and the output end of the voltage output module (namely, VDD end and a VIN end), and a capacitor C63 and a zener diode D61 may be provided in parallel between the VIN end and ground.

In one embodiment, the transformation rule includes at least one of:

accumulating a first reference numerical value on the basis of the first numerical value to obtain the second numerical value;

accumulating a second reference numerical value on the basis of the first numerical value to obtain the second numerical value;

multiplying a third reference numerical value on the basis of the first numerical value to obtain the second numerical value; and obtaining the second numerical value by dividing the first numerical value by a fourth reference numerical value.

The calculation of accumulation, subtraction, multiplication and division can use decimal calculation, and can also use binary or other binary calculation. The first reference numerical value, the second reference numerical value, the third reference numerical value and the fourth reference numerical value may be fixed values or variable values, and the signs thereof are generally consistent and non-zero, for example positive numbers.

Taking the accumulated first reference numerical value as an example, the accumulated first reference numerical value may be a positive number which varies within a certain range, and in further examples, the accumulated value may vary in a certain law. For example, if the change is made in cycles of Accumulate 1, Accumulate 2 and Accumulate 3, then in the kth transformation, it is realized by accumulating 1, in the k+1th transformation, it is realized by accumulating 2, in the k+2nd transformation, it is realized by accumulating 3, and in the k+3rd transformation, it is realized by accumulating 1 again.

Corresponding to the above-mentioned various cases, when applied to a control method of a receiving end, there are:

if the transformation rule is accumulating a first reference numerical value on the basis of the first numerical value to obtain the second numerical value, then step S402, specifically includes: verifying whether the current verification identifier is greater than the historical verification identifier, or verifying whether the current verification identifier is greater than the historical verification identifier, and a difference between the current verification identifier and the historical verification identifier matches the first reference numerical value;

if the transformation rule is subtracting the second reference numerical value on the basis of the first numerical value to obtain the second numerical value, then S402 specifically includes: verifying whether the current verification identifier is less than the historical verification identifier, or verifying whether the current verification identifier is less than the historical verification identifier, and a difference between the current verification identifier and the historical verification identifier matches the second reference numerical value;

if the transformation rule is multiplying a third reference numerical value on the basis of the first numerical value to obtain the second numerical value, then step S402 specifically includes: verifying whether the current verification identifier is greater than the historical verification identifier, or verifying whether the current verification identifier is greater than the historical verification identifier, and a ratio of the current verification identifier with the historical verification identifier matches the third reference numerical value; and if the transformation rule is dividing a fourth reference numerical value on the basis of the first numerical value to obtain the second numerical value, then step S402, specifically includes: verifying whether the current verification identifier is less than the historical verification identifier, or verifying whether the current verification identifier is less than the historical verification identifier, and a ratio between the current verification identifier and the historical verification identifier matches the fourth reference numerical value.

In the above-mentioned solution, by comparing the difference value with the first numerical value and the second numerical value, and comparing the ratio value with the third numerical value and the fourth numerical value, it can not only verify whether the current verification identifier becomes larger or smaller than the historical verification identifier, but also verify the amplitude of the change, and furthermore, it can be possible for an attacker to perform an exhaustive attack using a numerical value larger (or smaller) than the current numerical value, so as to further improve the security.

The matching of the difference value with the first reference numerical value and the second reference numerical value can be understood as being the same or the difference being less than a certain threshold, and the matching of the ratio value with the third reference numerical value and the fourth reference numerical value can be understood as being the same or the difference being less than a certain threshold.

Figure 13:
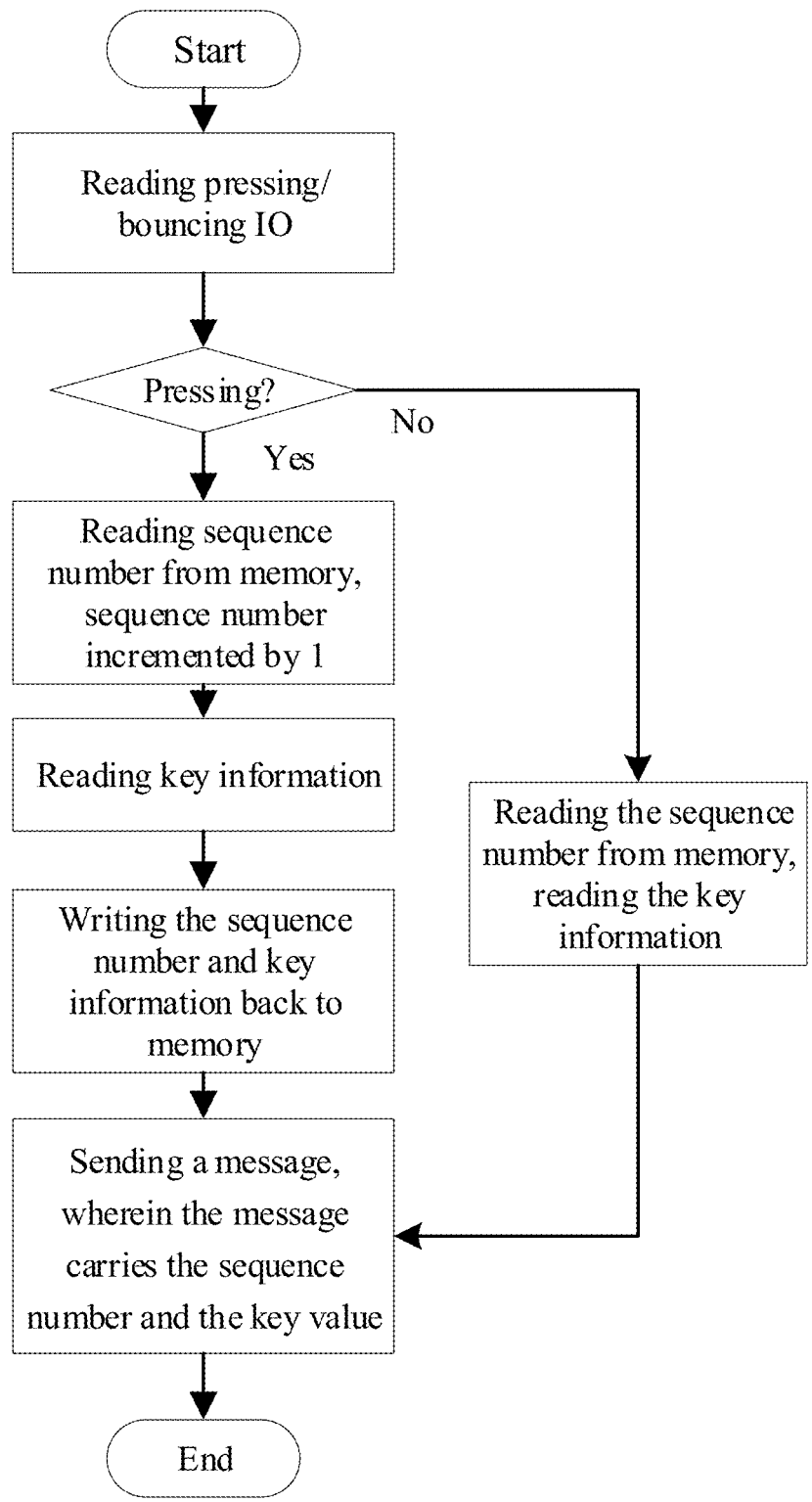
FIG. 13 is a schematic flowchart illustrating operation of the self-generating switch according to an embodiment of the present disclosure.

With reference to FIG. 13, in one example, a sequence number (namely, a verification identifier) is carried in a self-generating switch, and the sequence number self-increases (or self-decreases) each time the switch is pressed, and the sequence number does not self-increase once after a complete pressing+bouncing manipulation; the message carries information characterizing pressing/bouncing (it can be understood that the manipulation information can characterize a manipulation action).

Specifically, each time the self-generating switch is pressed, the self-generating switch will bounce back, and the generator will operate to generate electricity when pressed and bounced, thereby supplying power to the back-end circuit (e.g. processor, wireless communication module, memory, etc.). The back-end circuit can recognize whether it is the pressing manipulation action or the bouncing manipulation action via the polarity recognition module.

If it is the pressing manipulation action, a sequence number (namely, a stored verification identifier) is read from a memory, then the sequence number self-increases (which can be understood as the transformation), then button information is read, and the control message is generated (which can correspond to step S308). Then the sequence number and button information are written back into a memory, so as to be used for reading during bouncing, and then a message is sent (which may correspond to steps S310 and S313). The order of writing back to the memory and sending the message may be interchanged.

In case of the bouncing manipulation action, the sequence number is read directly from the memory without self-increasing (i.e. without performing the transformation), while the button information is also read directly from the memory (instead of reading the feedback signal of the micro-switch).

In one embodiment, the current control message further comprises signature information, the signature information being calculated based on a first key, and the signature information changing with a change of the current verification identifier; and the signature information is able to be verified by the receiving end through a second key, the first button matching the second key.

The button therein may be fixed, or may be refreshed by some method, after which the self-generating switch and the receiving end are resynchronized. For example, the keys may be varied based on a functional value of the independent variable over time, the functional relationship corresponding to the first button being adapted to the functional relationship corresponding to the second key.

In one specific example, the button may be a string of secret data, wherein the signature information may be formed by a predetermined algorithm (e.g. the AES algorithm) based on the plaintext and the button combined together. The plaintext may, for example, control at least part of the content of the message, which may contain the authentication identifier but not the signature. For example, in the self-generating switch, the processor can use the first button to encrypt the contents of the remaining fields except the signature field in the payload portion of the current control message required to be sent out to obtain signature information. In the receiving end, the receiving end can use the second button to encrypt the contents of the remaining fields except the signature field in the payload portion of the received current control message to obtain signature information; and the receiving end can use the calculated signature information to verify the signature information recorded in the current control message.

In addition, the first button and the second button may be the same, or in other examples, they may be different.

The anti-counterfeiting function can be realized through signature information to ensure security. In order to facilitate the explanation of the role of signature information and verification identifier (e.g. sequence number), several concepts are clarified below.

Copy Attack:

It can be understood as: the attacker first grabs a valid switch message and then sends it out remaining it unchanged. Through the use of verification identifier, it is feasible to effectively prevent replication attack. For example, the receiving end will store the sequence number (namely, the verification identifier) of the last received message, and after receiving a new message, even if the verification signature information is valid, the sequence number will continue to be checked. It is not allowed to be a sequence number that has been received at the time of the previous pressing or bouncing, but only a sequence number that is larger than the previous one and falls within a window (all, or a sufficiently large sliding window).

Forgery Attack:

It can be understood that an attacker can operate a real device (e.g. a self-generating switch) that can send out a control message, and then actively add 1 to the sequence number (if the sequence number is plaintext) to reconstruct the message.

By means of the signature information, forgery attacks can be effectively prevented, and (if the sequence number is plaintext) the signature information is calculated from the previous message content by means of the key. The self-generating switch is encrypted with a key, and the receiving end calculates once with the key, and if the pair is obtained, the message of the transmitting end is considered to be legal.

Verification identifier (e.g. sequence number) and signature information are used. For example:

The sequence numbers of the receiving end and the self-generating switch are synchronized in the pairing process. The matching process may not verify the sequence number, and may choose to still verify the signature information, that is, the matching process only considers anti-counterfeiting and not anti-copying. Of course, it is also possible to verify the signature information.

In normal operation, the signature information is checked on the one hand and the sequence number is verified on the other hand, only allowed to be larger (or smaller) than the previous sequence number. If further rigorous verification is to be performed, it is required that the sequence number is larger than the previous sequence number and falls within a window (the window may embody, for example, the first reference numerical value, the second reference numerical value, the third reference numerical value, the fourth reference numerical value mentioned above). Window-based verification can be effective against exhaustive attacks. For example, if a window is not required, an attacker can perform an exhaustive attack with a sequence number larger than the current sequence number.

In one embodiment, the authentication identifier (e.g. sequence number) itself is converted prior to transmission such that the attacker cannot obtain the current sequence number. Further, the current verification identifier recorded in the current control message is a converted current verification identifier, wherein the conversion method is a first data conversion method, namely: the current verification identifier recorded in the current control message is the current verification identifier converted by the first data conversion method; and the current verification identifier verified by the receiving end is obtained by reversely converting the converted current verification identifier, a manner of reverse conversion being a second data conversion manner, and the first data conversion manner and the second data conversion manner being opposite data conversion manners. Namely, the current verification identifier verified by the receiving end is obtained after performing inverse conversion on the converted current verification identifier via a second data conversion method.

The first data conversion mode is the reverse of the second data conversion mode, and no matter what conversion mode is used, it does not depart from the scope of the embodiments of the present disclosure.

In a specific example, referring to FIG. 18, the receiving end can check the duplicate according to "ID-sequence number". The ID therein can be understood as an equipment vendor identifier (corresponding to the equipment vendor ID in FIGS. 15 and 16), and for a specific ID, after the message is received, the sequence number of the message is stored. The next time after the message with the same ID is received, the sequence number (namely, the current verification identifier) is compared with a previous one, and if the sequence number is the same as a historical value (namely, the historical verification identifier), then the deemed repeated message is discarded; if it is newer than the historical value, it is considered to be a new message, and subsequent processing is performed.

Specifically, after a message is received, firstly a basic determination on message validity is made according to a message format. Then, a sequence number therein is extracted; the sequence number is compared with the historical value (namely, the current verification identifier is compared with the historical verification identifier for verification); if it is greater than the historical value, a corresponding control action (namely, a control event) is executed, and simultaneously a new sequence number is written into the historical value for standby. If not, it is considered a duplicate sequence number, which is discarded.

In one implementation, the current control message is sent by the self-generating switch via Bluetooth, and then the wireless communication module is a Bluetooth module; and a method for sending a packet and scanning for receiving a data packet when using Bluetooth for communication is described below.

The receiving end receives a data packet according to a pre-set wake-up and sleep period (it can also be understood that the wake-up and sleep of a data packet receiving function of the receiving end is controlled according to the wake-up and sleep period), and in the specific example, the receiving end itself can wake-up and sleep according to the wake-up and sleep period, and the wake-up and sleep period includes alternating wake-up periods and sleep periods. Namely, after the wake-up period passes, a sleep period is entered, and after the sleep period passes, a wake-up period is entered, and the cycle is repeated, and the receiving end only receives a data packet during the wake-up period.

Figure 14:
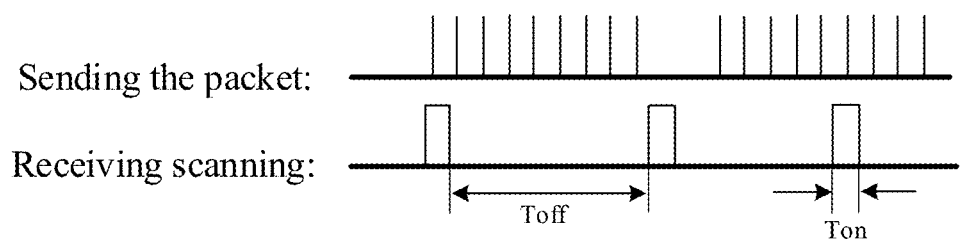
FIG. 14 is a schematic principle diagram of receiving and sending data packet according to an embodiment of the present disclosure.
Figure 17:
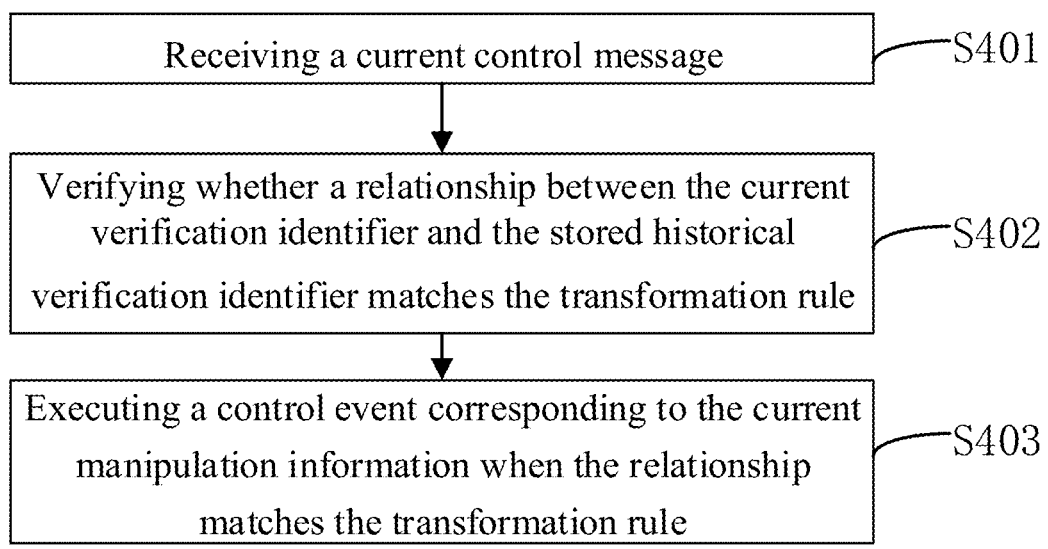
FIG. 17 is a schematic flowchart of a receiving end control method according to an embodiment of the present disclosure.

In FIG. 14, the waveform for receiving scanning is a schematic waveform for a receiving end to receive a scanning data packet, wherein the wake-up period can be characterized as Ton, the sleep period can be characterized as Toff, and the waveform for sending a packet is a schematic waveform for sending a data packet from a power generation switch, wherein the protruding waveform is a sending period which can be considered as a data packet.

In step S308, the corresponding current control message is sent to the receiving end via the wireless communication module, specifically including:

N groups of data packets to outside are successively broadcast via the Bluetooth, such that the receiving end grabs at least one data packet during the wake-up period, each group of data packets comprising a plurality of data packets, and each data packet containing the current control packet; and a broadcast interval of adjacent data packets in the N groups of data packets matching a wake-up sleep period of the receiving end, with N≥2.

Corresponding to step S308, step S401 may specifically include that:

in the wake-up period, at least one data packet in N groups of data packets sent by the self-generating switch is grabbed via Bluetooth, the N groups of data packets are successively broadcast to the outside via Bluetooth, and each data packet contains the current control packet.

The broadcast interval can be understood as the interval between the starting broadcast times of two adjacent groups of data packets, which can also be regarded as a broadcast period of each group of data packets, and only one group of data packets is sent in each broadcast period.

A duration of the wake-up period is greater than or equal to the broadcast interval of two adjacent data packets; and a duration of the sleep period is less than or equal to N−1 times the broadcast interval.

With the above-mentioned technical solution, it is helpful to ensure that the receiving end can receive the data packet during the wake-up period no matter when the self-generating switch sends out the data packet during the receiving and sending of the data packet.

In the case where the wake-up period Ton corresponds a large period for sending data packets, there is at least one packet in the window of the wake-up period Ton, namely, it is impossible for the wake-up period Ton to all fall within the broadcast interval (for example, 20 mS), and the wake-up period Ton is greater than or equal to the broadcast interval (for example, 20 mS).

At the same time, it is also guaranteed that at least one packet falls outside the window of the sleep period Toff, and in view of the fact that the packet itself needs to be sent for a certain duration (for example, 1 mS), the sleep period Toff is guaranteed to be less than or equal to the broadcast interval*(N−1), for example, less than or equal to 20 mS*(N−1).

In a specific example, a specified packet sending interval duration (namely, a formed broadcast interval) can be selected as 20 mS.

The wake-up and sleep period of the receiving end can be 100 mS; and the duty cycle may be 20%.

Accordingly, the wake-up period Ton is 20 mS, and the sleep period Toff is 80 mS.

Under the above-mentioned parameters, if the self-generating switch can send 5 groups of data packets, the receiving end can scan at least one group of data packets. If the transmitting end can send 10 groups of data packets, the receiving end can scan at least two groups of data packets.

In another specific example, if N=5, then the wake-up period Ton can be specifically 25 mS, and the sleep period Toff can be specifically 75 mS, and furthermore, the corresponding duty cycle is 25%, and the receiving end can scan at least one group of data packets with a certain margin.

In yet another specific example, the wake-up and sleep period can be 125 mS, the wake-up period Ton can be specifically 25 mS, and the sleep period can be specifically 100 mS, and accordingly, if the packet sending interval is 20 mS, then: 20 mS*(N−1) needs to be greater than or equal to 100 mS, in turn, N≥6 (i.e: at least 6 groups of data packets need to be sent), wherein when N=6, at least one group of data packets falls within the wake-up period to be scanned.

In a further example, a plurality of data packets in the same group are transmitted through at least two of the following channels:

2.402 GHz; 2.428 GHz; 2.480 GHz.

The processor sequentially broadcasts N groups of data packets to the outside via the Bluetooth module specifically includes:

the processor counting a time of the broadcast interval after starting to send a group of data packets, and sending out a corresponding other group of data packets when the count reaches a specified packet sending interval; and accordingly, the processor 108, when sequentially broadcasting N groups of data packets to the outside via the Bluetooth module, is specifically configured for:

counting a time of the broadcast interval after starting to send a group of data packets, and sending out a corresponding other group of data packets when the count reaches a specified packet sending interval.

The above-mentioned timing functions may be implemented using a timing module integrated into the processor.

In a specific example, the signal transmitted by the wireless communication module is a Bluetooth signal. For example, 2.4 GHZ is used as a carrier frequency, and data packets are respectively transmitted via a designated Bluetooth channel. Specifically, the self-generating Bluetooth switch transmits data in 40 2-MHz channels using low-power Bluetooth technology. Preferably, the data is transmitted in a broadcast channel. The frequency points of the three broadcast frequency channels are respectively: 2.402 GHz for channel 37; 2.428 GHz for channel 38; and 2.480 GHz for channel 39.

Therein, more than one packet signal will be sent at each pressing, e.g. 3-10 packets of data may be sent. The processor may be integrated with a timing module as mentioned above, the timing module being used for delaying transmission interval.

In one example, the packet sending interval duration may be 20 mS, and may be randomly fluctuated within the range of 20 mS±5 mS (namely: the specified packet sending interval duration may be in the interval range of 15 ms to 25 ms) in order to reduce the probability that the transmitted data packets of different switches collide in the air.

In one implementation, taking FIGS. 15 and 16 as an example, the data structure of the current control message (the control message of the embodiment of the present disclosure can satisfy the data structure) includes:

a header portion (corresponding to "header information" shown in the figure), a payload portion (corresponding to "PayLoad" shown in the figure, which is a AD Structure) and a CRC check part (corresponding to "CRC" shown in the figure);

the payload portion includes:

a button value field for recording a button value (corresponding to a "button value" shown in the figure), the button value being information characterizing the button and/or the manipulation action in current manipulation information; and a verification identifier field used for recording the current verification identifier (corresponding to a "sequence number" shown in the figure).

In a further solution, the data structure of the current control message further includes: a physical address portion (corresponding to "MAC" shown in the figure).

The physical address portion includes:

a switch identifier field (corresponding to "MAC L" shown in the figure) for recording the switch identifier using 4 bytes; the switch identifier therein can also be expressed as Source ID, and furthermore, in the message, 4 bytes in the physical address portion are used to represent the Source ID of the self-generating switch, and the payload portion may also contain the switch identifier, or may not additionally contain the switch identifier, and if not, the length of the message is reduced as far as possible to save power.

The payload portion further includes a frame header control field (corresponding to "Frame Header" shown in the figure), the frame header control field including:

a switch identifier indication field (corresponding to an "ID type" shown in the figure) for using one bit to record whether the payload portion records the switch. For example, taking FIG. 15 as an example, if the field is 0, it means that the payload portion does not additionally contain a Source ID (namely, the switch identifier). Taking FIG. 16 as an example, if the field is 1, it means that the payload portion additionally contains a 4-byte Source ID (namely, the switch identifier), and the above-mentioned design can be used to solve the problem that the upper layer application of the iOS device cannot obtain the MAC of the message.

The payload portion further includes:
a signature field (corresponding to a "signature" shown in the figure) used for recording signature information using 4 bytes; furthermore, the message length is reduced as much as possible while ensuring the encryption strength.

The frame header control field further includes:
an encryption indication field (corresponding to an "encryption type" shown in the figure) used for recording whether the signature information is contained in the payload portion using one bit. For example, if it is 0, it means that the information is included, and if it is 1, another encryption mode is reserved.

In addition, the header portion includes:
a preamble code field (corresponding to "preamble" shown in the figure), an access address field (corresponding to "Access Address" shown in the figure), and a protocol data unit data header field (corresponding to "PDU Header" shown in the figure).

The payload portion includes:
a length field (corresponding to "length" shown in the figure), a broadcast type field (corresponding to "AD type" shown in the figure), a equipment vendor identification field (corresponding to "equipment vendor ID" shown in the figure), and a switch type field (corresponding to "switch type" shown in the figure);

The frame header control field further includes: a version number field (corresponding to a "version number" shown in the figure), and a forwarding number field (corresponding to a "forwarding count" shown in the figure); and
the CRC verification portion includes a CRC calculation value field.

A specific example of the process for the receiving end executing the control event will be described below.

In an implementation, the receiving end can be a wall switch, in which the control event comprises at least one of:
the wall switch being turned off;
the wall switch being open;
closing a designated function of the wall switch;
opening a designated function of the wall switch; and
sending a designated signal to outside.

Control events can be understood with reference to the above-mentioned examples for other receiving ends that function like wall switches.

Regardless of the receiving end, the control event may include at least one of:
switching a switch state of the receiving end, the switch state meaning that the receiving end is opened or closed; and
changing an operating parameter of the receiving end.

In one embodiment, step S403 may specifically include:
according to the current manipulation information, detecting whether predefined state switching manipulation and parameter changing manipulation occur, or detecting whether the state switching manipulation and the parameter changing manipulation have occurred according to the current manipulation information and previously received manipulation information;
if the state switching manipulation occurs, switching a switch state of the receiving end;
if the parameter changing manipulation occurs, changing an operating parameter of the receiving end; and
the state switching manipulation being distinguished from the parameter changing manipulation.

In a further example, the state switching manipulation is that a duration of pressing a corresponding button is less than a specified duration; and the parameter changing manipulation is that a duration of pressing the corresponding button is longer than the specified duration. In other examples, the state switching manipulation may also be that a duration of pressing a corresponding button is longer than a specified duration; and the parameter changing manipulation is that a duration of pressing the corresponding button is less than the specified duration.

In the above-mentioned technical solution, if the receiver is a lamp, then: in one example, for a key, a short pressing (released immediately after pressing) may effect a basic ON/OFF toggle command, such as turning the lamp on and off, and a long pressing may effect dimming (e.g. adjusting the brightness of the light).

In one embodiment, step S403 may specifically include:
if the current manipulation information is manipulation information for starting to change, then starting to change the operating parameter of the receiving end;
if the current manipulation information is manipulation information for stopping changing, then stopping changing the operating parameter of the receiving end; and
the button and/or manipulation action characterized by the manipulation information for starting to change is different from the button and/or manipulation action characterized by the manipulation information for stopping changing.

In a further example, the manipulation information for starting to change characterizes a manipulation action of a corresponding button being pressed; and the manipulation information for stopping changing characterizes a manipulation action of a corresponding button being bounced. In other examples, the manipulation information for starting to change and the manipulation information for stopping changing may characterize a manipulation action of different keys and may also be a manipulation action of a different number of presses.

In one implementation, with regard to the same button of the same switch, if the corresponding pressing manipulation information and bouncing manipulation information correspond to different control events, then
the historical verification identifier stored in the receiving end is determined according to the verification identifier recorded in the control message generated by a specified manipulation action; and the specified manipulation action is the pressing manipulation information or bouncing manipulation information or the key. For example, a receiving end may store a current verification identifier therein as a historical verification identifier only when a control message generated by a pressing manipulation action is received. For example, the receiving end may store the current verification identifier therein as the historical verification identifier only when the control message generated by the bouncing manipulation action is received.

The receiving end of the above-mentioned adjustable operating parameters may for example be any one of the following: lights, fans, automatic curtains. However, it is also not limited to this, and any receiving end that has an operating parameter adjustment requirement may be used as an alternative.

Figure 19:
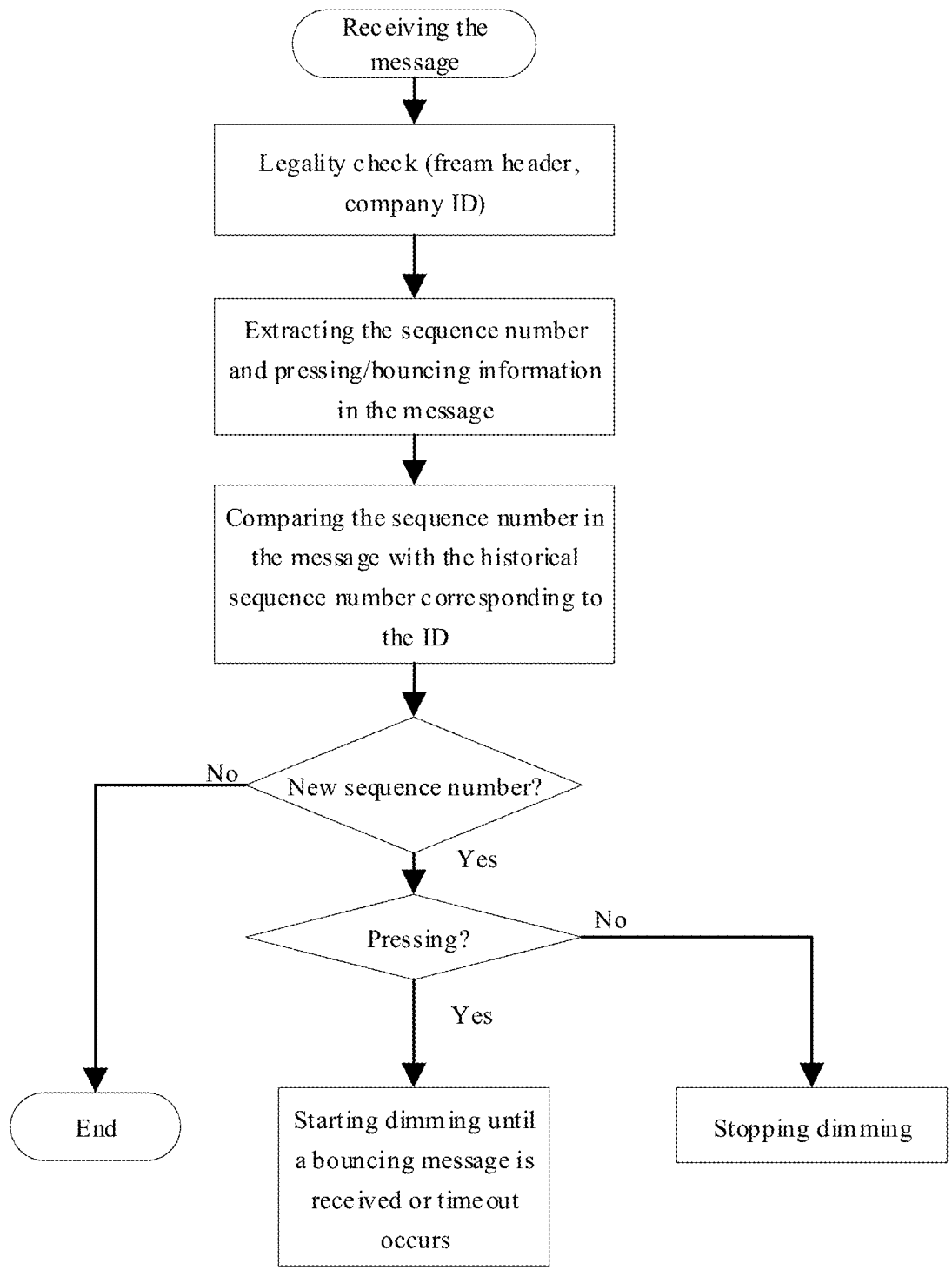
FIG. 19 is a schematic flowchart II illustrating operation of the receiving end according to an embodiment of the present disclosure.

With reference to FIG. 19, if the receiving end is a lamp, an example of a scheme for dimming the lamp is as follows: it mainly realizes starting dimming when the button is pressed, and stopping dimming when the button is bounced. At this time, the sequence number can be used for checking the repetition of the multi-packet data transmitted at the time of pressing and bouncing.

Specifically, after a control message is received, firstly a basic message validity determination is made according to a message format, and then a sequence number therein is extracted; the sequence number is compared with the historical value (namely, the current verification identifier is compared with the historical verification identifier for verification); if it is not greater than the historical value, it is considered a duplicate sequence number, which is discarded. If it is greater than a historical value, and is a message controlled by pressing, then dimming is started; if it is greater than the historical value and is a message of bouncing manipulation, then dimming is stopped; and the new sequence number is also written to the history value for future use. The process may correspond to the process described above for manipulation information for starting to change and stopping change manipulation information for stopping changing.

In another example, a short pressing (released immediately after pressing) implements a basic ON/OFF flip command and a long pressing implements dimming for the same key. The process may correspond to the process described above for state switch manipulation information and parameter changing manipulation information.

Figure 20:
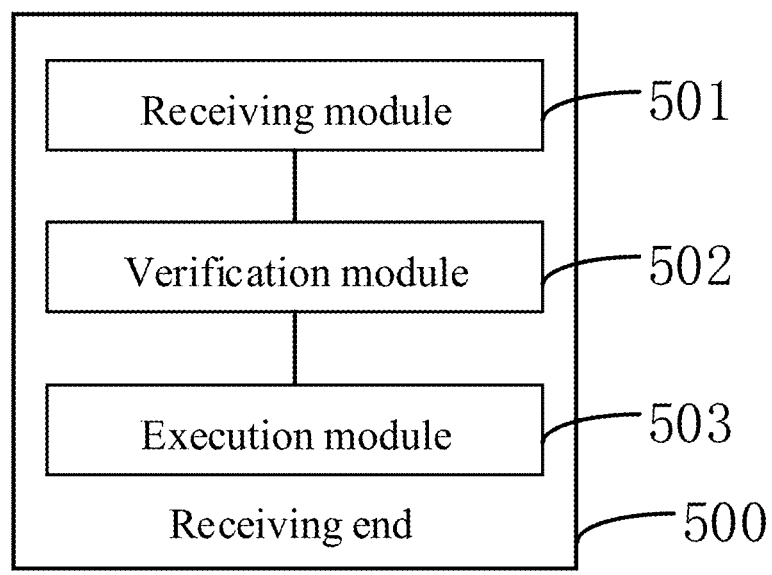
FIG. 20 is a schematic diagram of a program module of the receiving end according to an embodiment of the present disclosure.

Referring to FIG. 20, an embodiment of the present disclosure also provides a receiving end, which can be understood as being used for the receiving end control method in real time or above, and can also be understood as a receiving end 500, including:
- a receiving module 501 configured for receiving a current control message, the current control message being sent out by a self-generating switch via the switch control method or the self-generating switch;
- a verification module 502 configured for verifying whether a relationship between the current verification identifier and the stored historical verification identifier matches the transformation rule; and
- an execution module 503 configured for executing a control event corresponding to the current manipulation information when the relationship matches the transformation rule.

Embodiments of the present disclosure also provide a control system (understandable with reference to FIG. 1) that includes a self-generating switch and a receiving end.

In some solutions, the control system may further include a gateway (or a router), and the gateway may be communicatively connected to the self-generating switch and the receiving end, respectively. In one example, the communication method thereof may all use Bluetooth or may not be limited to Bluetooth. The gateway may be a device dedicated to network communication, or may be a device having other specific functions (for example, it may be a voice speaker having a gateway function).

Figure 21:
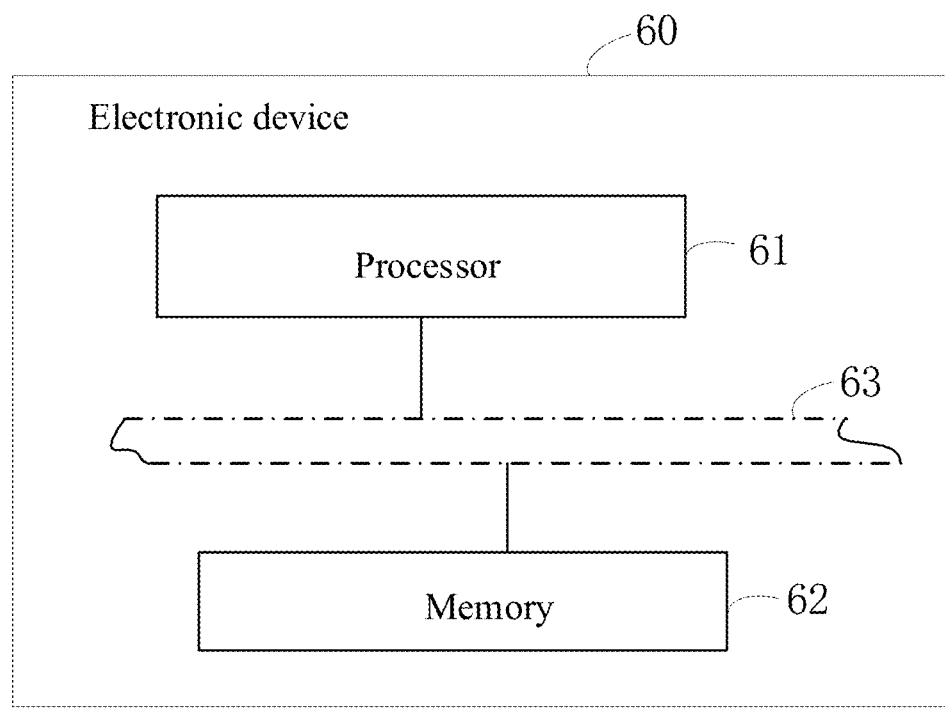
FIG. 21 is a schematic configuration diagram of an electronic device according to an embodiment of the present disclosure.

With reference to FIG. 21, an electronic device 60 is provided which includes:
- a processor 61; and
- a memory 62 for storing executable instructions of the processor, wherein the processor 61 is configured to perform the above-mentioned receiving end control method via execution of the executable instructions.

The processor 61 is capable of communicating with memory 62 over bus 63.

The embodiment further provides a computer-readable storage medium having stored thereon computer programs, wherein the programs, when executed by a processor, implement the method described above.

In order to facilitate an understanding of the structure of the self-generating switch 1, an alternative self-generating switch will be described below with reference to FIGS. 22 to 29, 30*a* and 30*b*.

Referring to FIGS. 22 to 29, 30*a*, and 30*b*, the self-generating switch further including a bottom shell 113 and a middle shell 119, the middle shell 119 covering the bottom shell 113 to form an inner space, the circuit board 114, the switching circuit, and the transmission portion 117 are located in the inner space, and the button 101 is located on a side of the middle shell 119 facing away from the inner space. In other embodiments, only the bottom shell 113 may be provided without the middle shell 119.

With reference to FIGS. 22-29, the moving portion 1031 of the generator 103 may be a power generation paddle, wherein the power generation paddle is understood to be any configuration that can be actuated to generate electrical energy from mechanical energy, and may be in the form of a plate, rod, ring, etc.

Figure 23:
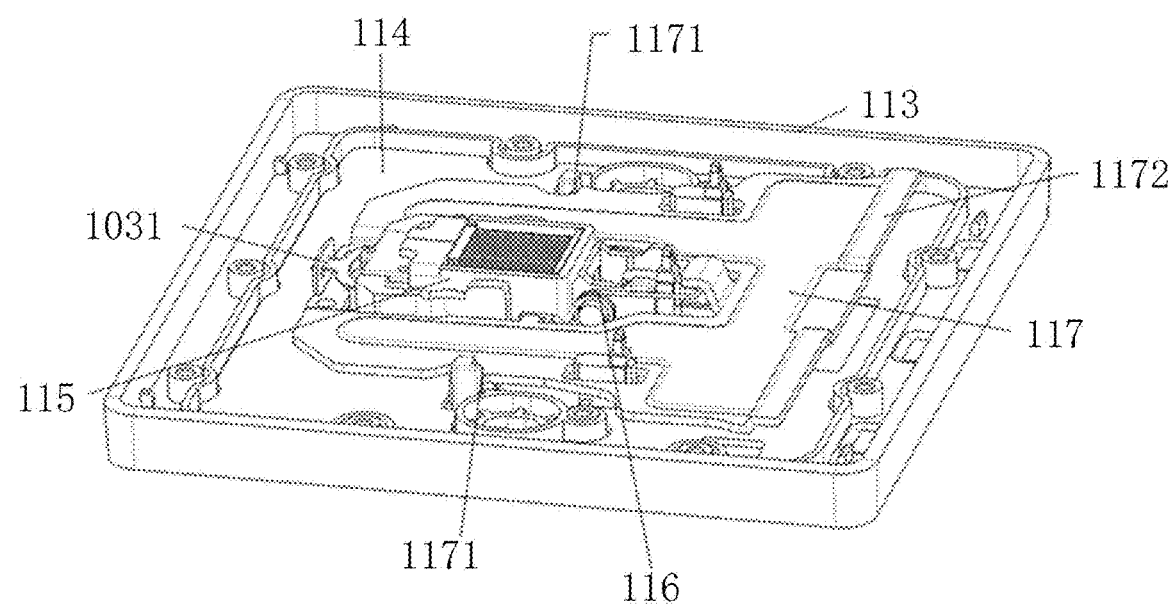
FIG. 23 is a partial schematic structural diagram I of the self-generating switch according to an embodiment of the present disclosure.

The moving portion 1031 of the electric generator 103 is located on a side (for example, a left side as shown in FIG. 23), near a non-pressing end of the button 101, of the electric generator 103, namely, the moving portion 1031 is located on one side of one end of the generator 103, and the micro-switch 1101 (namely, a detection unit) is located on one side of the other end of the generator 103.

The first end of the transmission component 117 is adapted to be pressed directly or indirectly by the button 5, e.g. it may be controllably pressed by means of a pressing portion 1172 of the switch, which may protrude from the surface of the transmission component 117.

The second end of the transmission component 117 serves to activate the moving portion 1031 when the first end thereof is pressed and/or when reset is driven by the reset force, such that the generator 103 generates power.

Here, the directions of movement of the first end and the second end of the transmission component 117 may be the same or different, and in any case, as long as the controlled pressing and the activation of the power generation paddle are achieved, the description of the present embodiment is not violated.

The transmission component 117 may be provided with a blade insertion hole 1175 for inserting the power generation blade (namely, the moving portion 1031).

In one embodiment, the bottom shell 113 is provided with a support portion 1131, and the support portion 1131 extends through the circuit board 114 to a side, facing away from the bottom surface of the bottom shell 113 of the circuit board 114, and correspondingly, the circuit board 114 may be provided with a through hole for the circuit board 114 to pass through, and the support portion 1131 is supported by the transmission component 117. The transmission component 117 is swingable about the support portion 1131 as a fulcrum, and changes between the first position state and the second position state via the swinging. Here, a quantity of the support portions 1131 may be two or more, which may be uniformly distributed on a lower side of the power transmission component 117.

Figure 25:
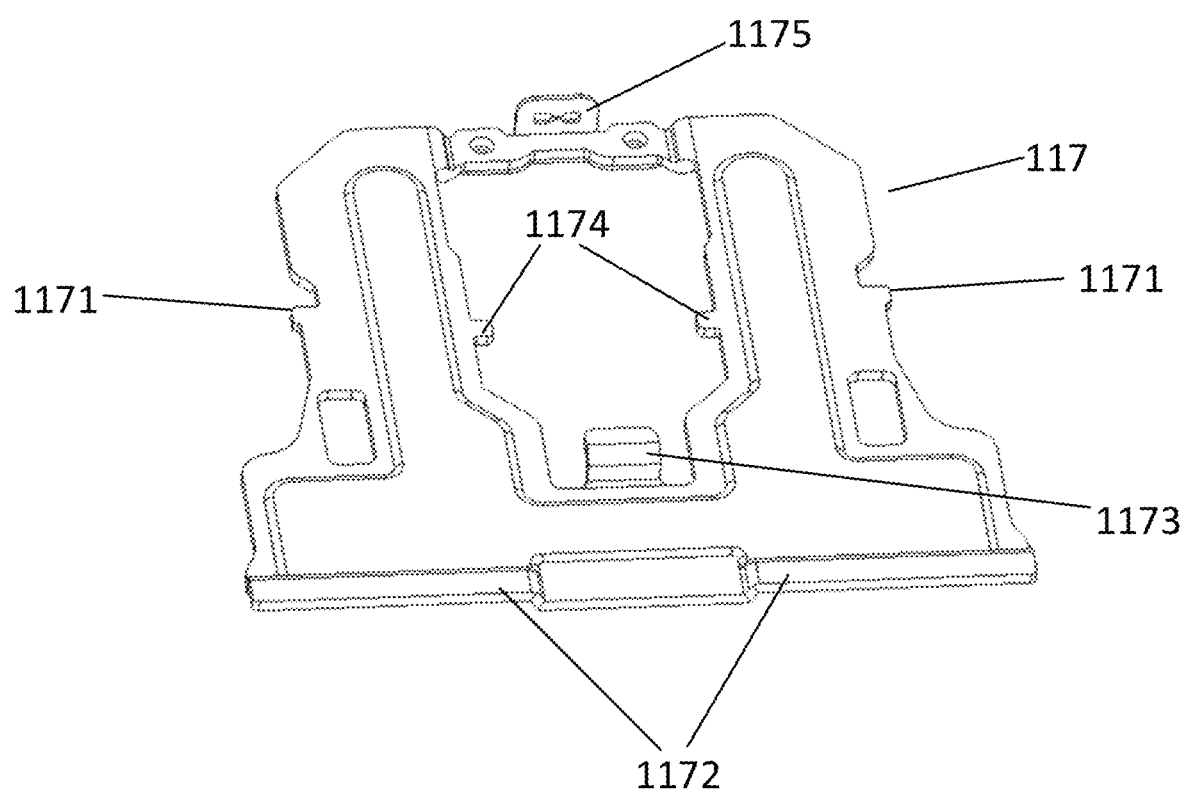
FIG. 25 is a schematic structural diagram of a transmission component according to an embodiment of the present disclosure.

Taking FIG. 25 as an example, the support portion 1131 can abut against a fulcrum position of the transmission component 117, and the fulcrum position may be provided with a structure for achieving the abutment or may not be provided with a structure, and the fulcrum position may be a single position or a variable position, and furthermore, a contact position between the support portion 1131 and the transmission component 117 may or may not change as the swinging occurs. The circuit board 114 can be fitted in the inner space formed by the bottom shell 113, and the generator 103 is connected to the circuit board 114, wherein the generator 103 can be mounted on the bottom shell 113 using a generator mounting buckle 1137; the transmission component 117 is connected to the bottom shell 113 via two fulcrum positions on two sides, and can specifically form a seesaw structure with a structure constituted by a connection line of the two pivot positions. One side end of the transmission component 117 is connected to a power generation paddle extending out of the generator 103. The reset member 102 is mounted on the bottom shell 113 and is connected to the other end or a position close to the other end of the transmission component 117. The generator 103 can be reset via the transmission component 117, and the other side end of the transmission component 117 can be provided with a switch pressing portion 1172.

Figure 28:
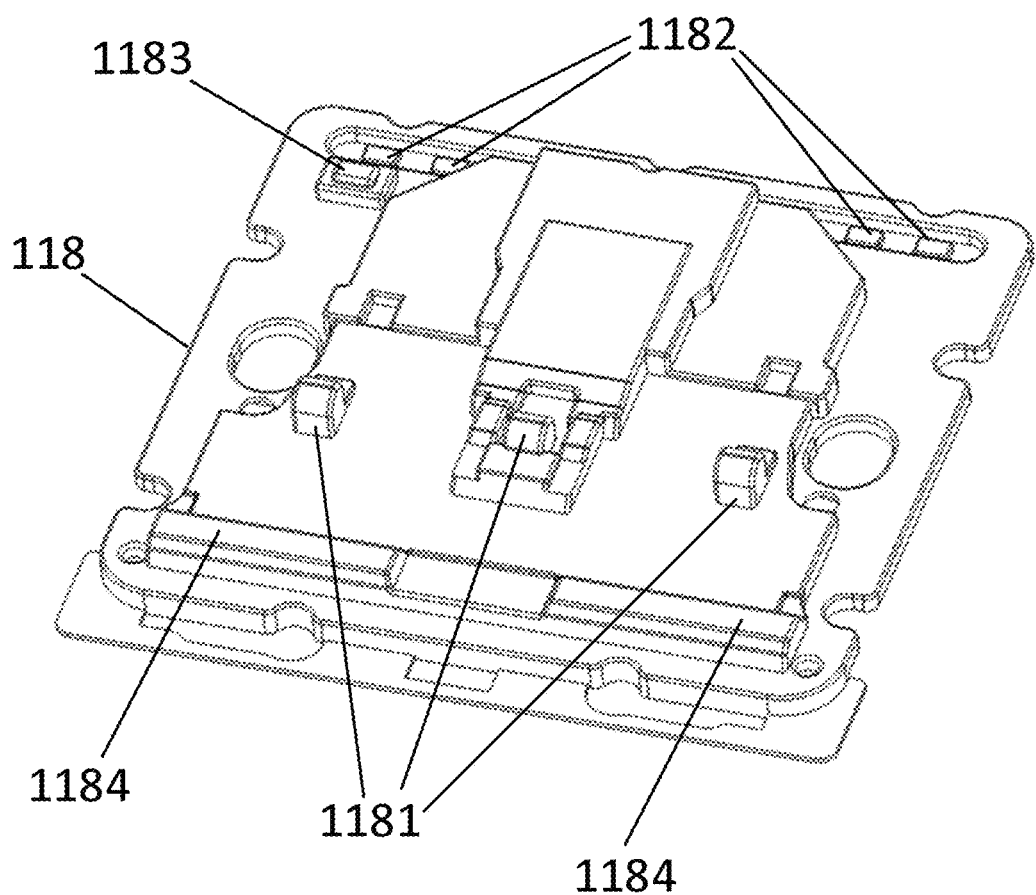
FIG. 28 is a schematic structural diagram of a waterproof layer according to an embodiment of the present disclosure.
Figure 29:
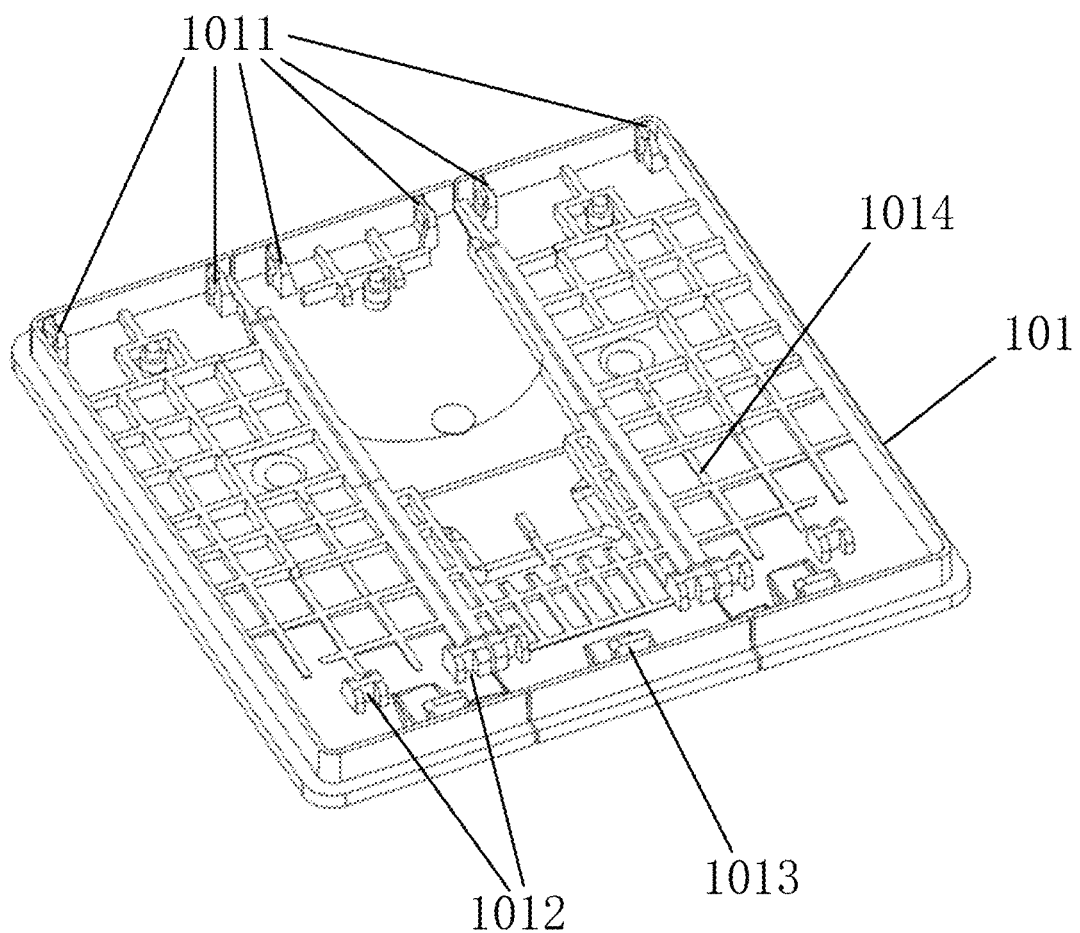
FIG. 29 is a schematic structural diagram of a button according to an embodiment of the present disclosure.
Figure 30A:
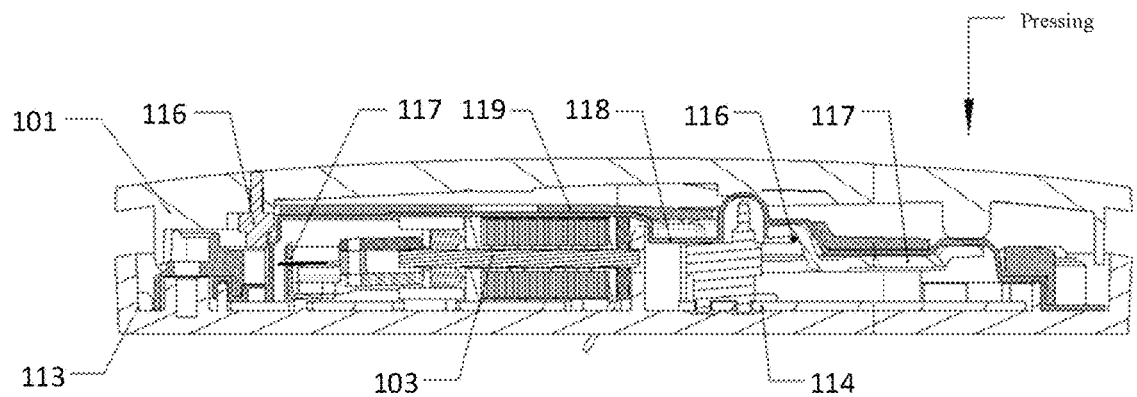
FIGS. 30a and 30b are schematic principle diagrams illustrating action of pressing the button according to an embodiment of the present disclosure.
Figure 30B:
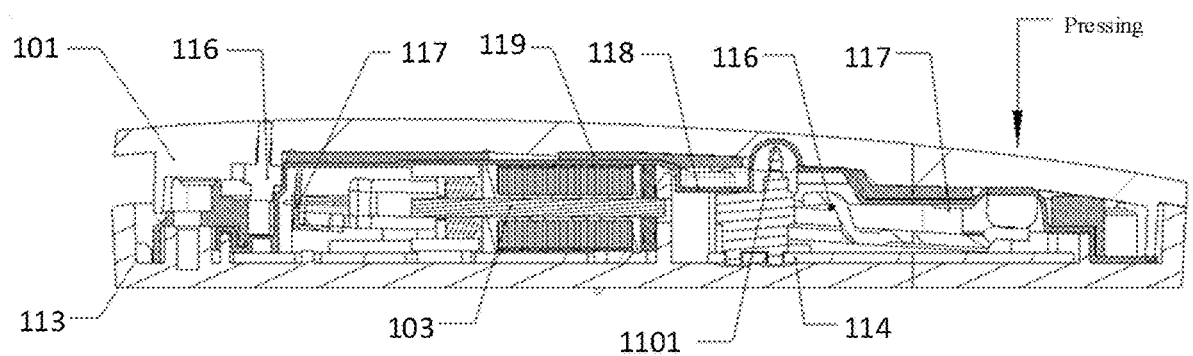

FIG. 30a is compared with FIG. 30b, in conjunction with FIGS. 22 to 29, after the button 101 is pressed, the button 101 triggers the transmission component 117 to perform a seesaw-type rotation, namely, the pressing end moves downwards, and the other end moves upwards, thereby driving the power generation paddle of the generator 103 to move. The kinetic energy of the generator 103 is converted into electric energy to supply power for the circuit board 114; at the same time, the pressed button triggers a micro-switch in the process of pressing down. At the same time, a light-emitting module (such as a LED) with the same quantity of keys is provided on the circuit board 114, and the LED will flash with every pressing to emit a signal.

After pressing, the transmission component 117 may return to the initial position under the action of the reset component 102 such as a torsion spring, thereby bringing the power generation paddle of the generator 103 back to the initial position. The button 101 can also be returned to the initial position by the transmission component 117.

Figure 24:
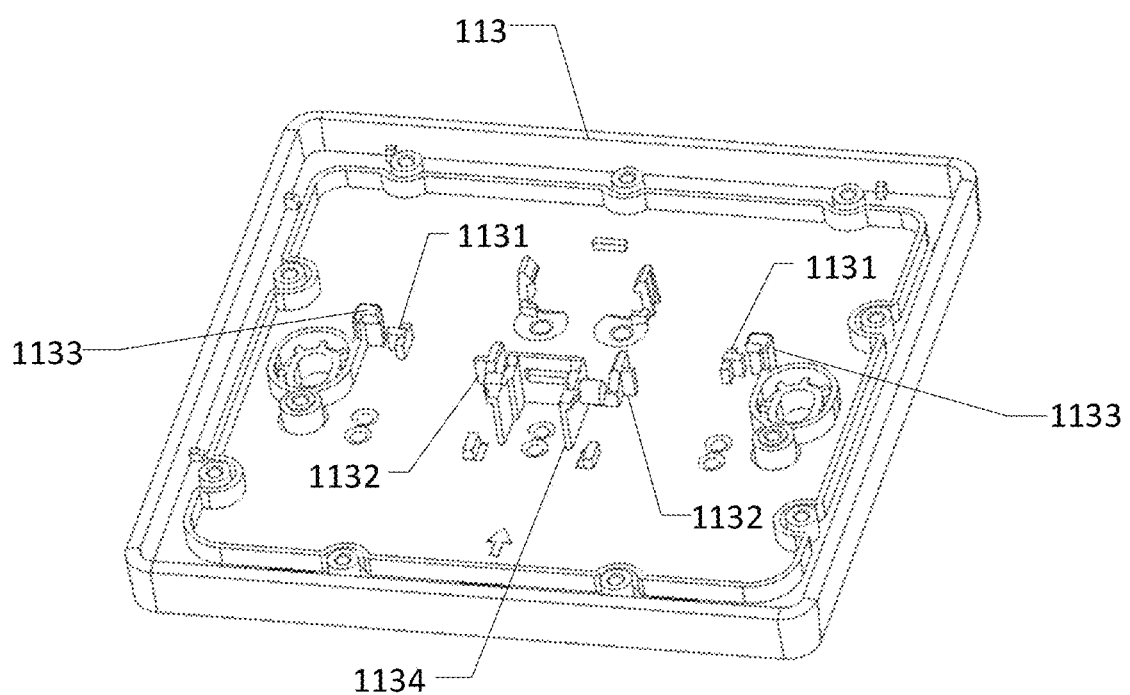
FIG. 24 is a schematic structural diagram of a bottom shell according to an embodiment of the present disclosure.

Referring to FIGS. 24 and 25, the bottom shell 1 is further provided with a movement limiting rib 1132, and the transmission component 117 is provided with a movement limiting boss 1174.

The movement limiting rib 1132 extends through the circuit board 114 to a side, facing away from the bottom surface of the bottom shell 113, of the circuit board 114, and correspondingly, the circuit board 114 can be provided with a through hole for the circuit board 114 to pass through, and the movement limiting rib 1132 can limit the movement of the moving limiting boss 1174 and the transmission component 117 in a first reference direction and/or a second reference direction. For example, during movement, the movement limiting rib 1132 can block the movement of the movement limiting boss 1174.

The first reference direction is a direction from the pressing end to the non-pressing end of the key, and the second reference direction is a direction from the non-pressing end to the pressing end of the key.

By the cooperation of the limiting boss and the limiting rib, the limiting can be realized with less processing difficulty.

With reference to FIG. 24, the bottom shell 113 is further provided with an upper limit snap 1133, the upper limit snap 1133 extends through the circuit board 114 to a side, facing away from the bottom surface of the bottom shell 1, of the circuit board 114, and the upper limit snap 1133 is used for limiting the movement of the transmission component 117 in a direction away from the circuit board 114. Accordingly, a limiting snap-fit portion 1171 can be provided on an edge of the transmission component, and the upper limit snap 1133 can block the limit snap-fit part 1171 when the transmission component swings, thereby playing a limit function.

Since the power generation paddle is near the non-pressing end, the upper limit snap 1133 limits movement away from the circuit board 114 of the end, near the non-pressing end, of the transmission component 117.

It can be seen that the movement position of the transmission component 117 can be conveniently defined by the limiting snap and movement limiting rib 1132.

The transmission component 117 referred to above can be regarded as a rocker, and the solution of swinging by means of the support portion can have the advantages of easy machining, easy control of the dimensions of the parts, etc.

In the specific implementation, if the quantity of the keys 101 is at least two, for example three as shown in the figure, then the transmission component 117 interfaces all keys 101 such that when any at least one button 101 is pressed, the transmission component 117 can be pushed to change the position state.

In one embodiment, the reset component 102 can be at least one of: torsion spring, shrapnel, spring.

When the reset component 102 is a torsion spring, a torsion spring base 1134 is provided on the bottom shell 113, the torsion spring base 1134 extends through the circuit board 114 to a side, facing away from the bottom surface of the bottom shell 113, of the circuit board 114, the torsion spring base 1134 is provided with a torsion spring mounting shaft, the torsion spring is mounted on the torsion spring mounting shaft, and the torsion spring also contacts a torsion spring connection portion 1173 provided on the transmission component 117 via a connecting rod, so as to apply the reset force to the transmission component 117 via the connection rod and the torsion spring connection portion 1173. In particular implementations, the torsion spring base 1134 may also be provided with a torsion spring limiting portion that may be used to limit the rotational position of the torsion spring.

Figure 22:
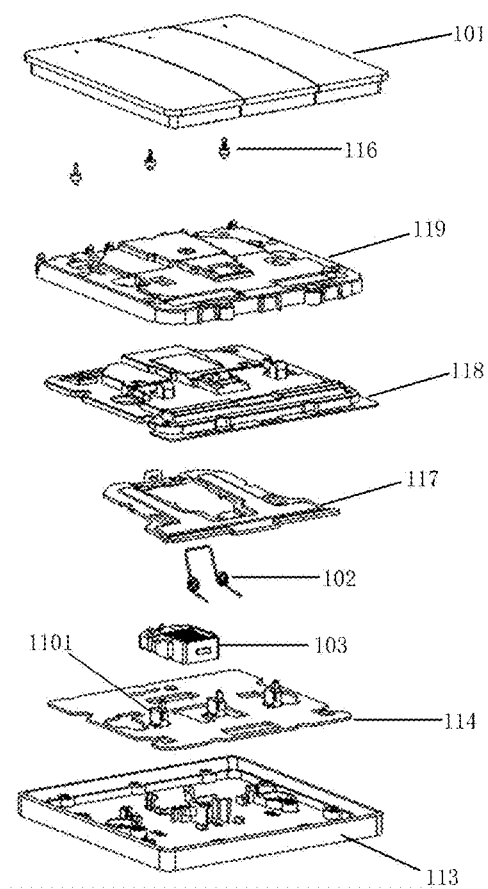
FIG. 22 is a schematic structural diagram of a self-generating switch according to an embodiment of the present disclosure.

In one embodiment, referring to FIGS. 22 and 28 in conjunction with FIGS. 30a and 30b, the self-generating switch further includes a waterproof layer 118 disposed between the middle shell 119 and the circuit board 114. A side surface, opposite to the middle shell 119, of the waterproof layer 118 may be attached to the middle shell 119.

Specifically, the waterproof layer 118 may be provided with a switch button mating portion 1181, the switch button mating portion 1181 protrudes from a side, facing away from the circuit board 114, of the waterproof layer 118, the middle shell 119 is provided with a button hole 1194, the switch button mating portion 1181 passes through the button hole 1194, the micro-switch 1101 extends into the switch button mating portion 1181, and the switch button mating portion 1181 respectively abuts the button 101 and the micro-switch 1101 in the direction in which the button 101 is pressed. Further, when the button 101 is pressed, the micro-switch 1101 can be clicked by the switch button mating portion 1181, thereby triggering the micro-switch 1101.

In addition, the waterproof layer 118 can also be provided with a pairing button mating portion 1183, wherein the position of the pairing button mating portion 1183 can match the position of the pairing key, and at the same time, a pairing switch device corresponding to a pairing circuit on the circuit board 114 can trigger the pairing switch device passing through the pairing button hole 1193 by pressing the pairing key, wherein the structural relationship of the pairing switch device, the pairing button hole, the pairing button mating portion and the pairing button can be understood with reference to the structural relationship of the micro-switch 1101, the button hole 1194, the switch button mating portion 1181 and the button 101.

The waterproof layer 118 may also be provided with a press-fit portion 1184 positioned to mate with a pressing portion receiving structure 1195 of the middle shell 119. Here, the pressing portion receiving structure 1195 can be understood as a structure for receiving the switch pressing portion 1172 when the switch pressing portion 1172 is lifted up.

In practice, the waterproof layer 118 may be a waterproof silicone.

In one embodiment, the middle shell 119 is provided with a middle shell light-transmitting hole 1192, the waterproof layer 118 is provided with a waterproof layer light-transmitting portion 1182, the button 101 is provided with a light-emitting portion, the light-guiding column passes through the middle shell light-transmitting hole 1192, and the two ends of the light-guiding column respectively extend until the positions of the light-emitting portion and the waterproof layer light-transmitting portion 1182, the light-guiding column, the middle shell light-transmitting hole 1192, the waterproof layer light-transmitting portion 1182 and the light-emitting portion match with the positions of the light-emitting module, which may refer to any matching manner in which the positions are close to each other.

Any of the above-mentioned structures that can achieve light transmission and light guidance do not depart from the description of the present embodiment.

Figure 26:
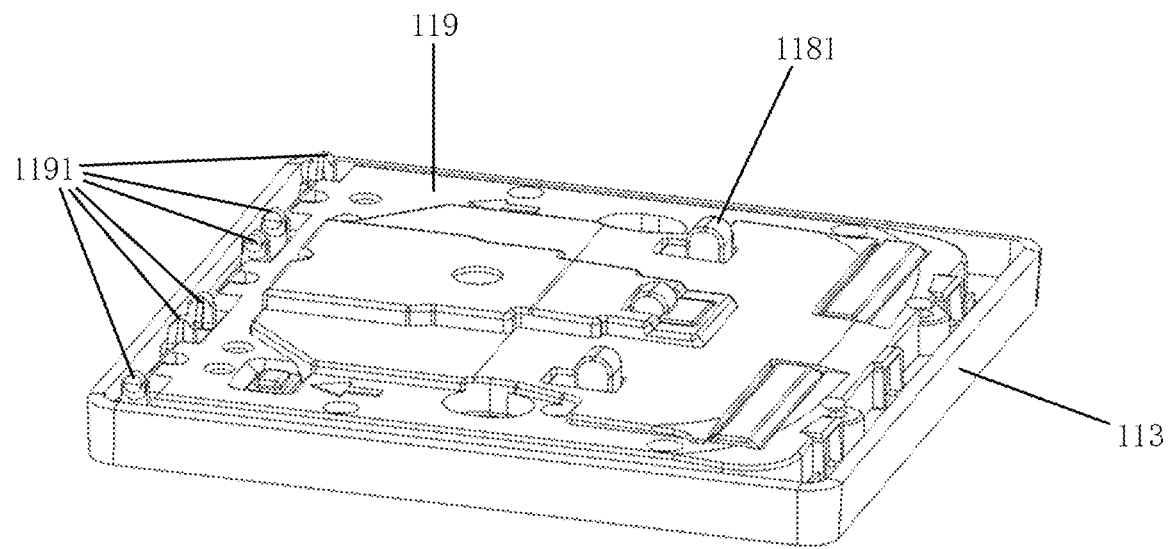
FIG. 26 is a partial schematic structural diagram II of the self-generating switch according to an embodiment of the present disclosure.
Figure 27:
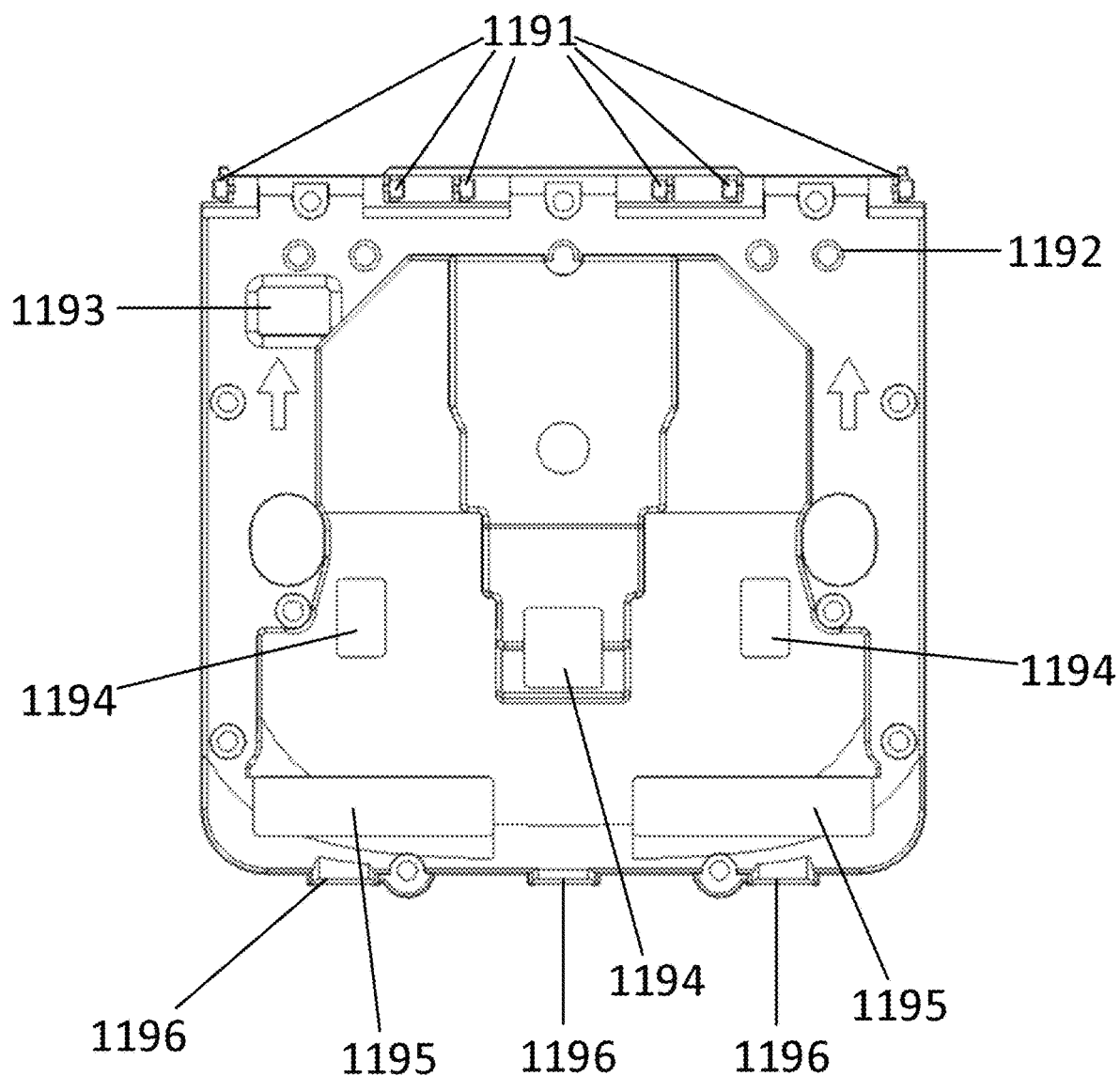
FIG. 27 is a schematic structural diagram of a middle shell according to an embodiment of the present disclosure.

In one embodiment, referring to FIGS. 26, 27 and 29, the middle shell or the bottom shell is provided with a first rotary shaft portion 1191, the non-pressing end of the button 101 is provided with a second rotary shaft portion 1011, the first rotary shaft portion 1191 is matingly connected to the second rotary shaft portion 1011, the button 101 can pivot towards or away from the middle shell 119 through the mating of the first rotary shaft portion 1191 and the second rotary shaft portion 1011, one side of the pressing end of the middle shell 119 or the bottom shell 113 has a first snap 1196, and the pressing end of the button is provided with a second snap 1013.

The first snap 1196 abuts the second snap 1013 to limit the pressing end of the button 101 from moving in a direction away from the middle shell 119.

In the illustrated example, the first rotary shaft portion 1191 is a rotary shaft, and the second rotary shaft portion 1011 is a shaft hole through which the corresponding rotary shaft passes, and in other examples not illustrated, the first rotary shaft portion is a shaft hole, and the second rotary shaft portion is a rotary shaft passing through the corresponding shaft hole.

A pressing portion 1012 is further provided on a side, facing the middle shell, of the button 101 and further, the switch pressing portion 1172 of the transmission component 117 can be directly or indirectly pressed by the pressing portion 1012. A side, facing the middle shell, of the button 101 may further be provided with a switch pressing portion 1014, and the switch pressing portion 1014 is used for pressing corresponding to the micro switch.

In a specific example, the waterproof layer 118 of silica gel is connected to the bottom shell 113, and the middle shell 119 is connected between the outer side of the waterproof layer 118 and the bottom shell 113, so as to compress the waterproof layer 118 (wherein the waterproof layer 118 of silica gel can be in an interference fit with the waterproof wall on the bottom shell 1 in structure) to achieve full sealing waterproof of the inner structure, and finally a button 101 is assembled, and the button 101 can be assembled on the bottom shell 1 and also can be assembled on the middle shell 119. The button 101 has one end as a pivot which is a fixed end, and the other end can perform a pivoting reciprocating movement (pressing down and resetting), namely, a pressing end of a switch.

In addition, the self-generating switch according to the present embodiment may be directly attached to a wall surface or other place using a double-sided adhesive tape, or may be mounted in a conventional switch back box using screws.

Finally, it should be noted that the above-mentioned embodiments are merely illustrative of the technical solution of the present disclosure, and are not restrictive. Although the present disclosure has been described in detail with reference to the foregoing embodiments, those skilled in the art will appreciate that the technical solutions disclosed in the above-mentioned embodiments can still be amended, or some or all of the technical features thereof can be replaced with equivalents. Such modifications and substitutions do not depart the substance of the corresponding technical solution from the scope of the technical solutions of the embodiments of the present disclosure.

The invention claimed is:

1. A switch control method based on a self-generating switch and a receiving end, which is applied to the self-generating switch, the self-generating switch comprising a processor, a memory, a button, a generator, a reset component, a rectification module, an energy storage module, a voltage output module, and a wireless communication module, the wireless communication module and the memory being electrically connected to the processor, an induction portion of the generator being electrically connected to the energy storage module via the rectification module, and the energy storage module being electrically connected to the wireless communication module, the processor and the memory via the voltage output module, the reset component being able to be transmitted with a moving portion of the generator, and the button also being able to be directly or indirectly transmitted with the moving portion of the generator;

the switch control method comprising:
if a control action of pressing down the button occurs, then the reset component deforming and generating a reset force to overcome the deformation, and the moving portion of the generator being directly or indirectly driven by the key, such that the generator generates a first induced voltage, and if the button undergoes a bouncing manipulation action, the reset component driving the moving portion of the generator under an action of the reset force, such that the generator generates a second induced voltage;

the rectification module storing first electric energy corresponding to the first induced voltage and/or second electric energy corresponding to the second induced voltage in the energy storage module; the energy storage module transmitting the stored electric energy to the voltage output module, and the voltage output module using the received electric energy to provide a required voltage to the processor, the memory and the wireless communication module so as to power on same;

after the processor, the memory and the wireless communication module are powered on, the processor generating and sending a corresponding current control message to the receiving end via the wireless communication module, and the current control message recording current manipulation information and the current verification identifier, such that the receiving end verifies whether a relationship between the current verification identifier in the current control message and the stored historical verification identifier matches a preset transformation rule of the current verification identifier, and executing a control event corresponding to current manipulation information when the relationship matches the transformation rule, the historical verification identifier being determined according to the verification identifier recorded in a control message or a pairing message sent to the receiving end by the self-generating switch previously; the current manipulation information characterizing at least one of: the self-generating switch; the button that the self-generating switch currently receives the manipulation; a manipulation action currently received by the button in the self-generating switch;

in one pressing manipulation action and one bouncing manipulation action which occur successively, with regard to at least one manipulation action therein, before, after or at the same time of generating and sending a corresponding current control message to the receiving end via the wireless communication module, the processor also reading the current verification identifier from the memory, changing and updating the current verification identifier from a first numerical value to a second numerical value according to a preset transformation rule, and writing back the updated current verification identifier to the memory before the electric energy stored in the energy storage module is exhausted, the first numerical value being different from the second numerical value.

2. The switch control method according to claim 1, wherein the self-generating switch further comprises a polarity recognition module; and the polarity recognition module is electrically connected to the generator and the processor; and before the processor reads a current verification identifier from the memory and updates the current verification identifier, the switch control method further comprises:

after the processor, the memory and the wireless communication module are powered on, the processor recognizes a currently occurring manipulation action of the button via the polarity recognition module, and determines the currently occurring manipulation action as a target manipulation action, the target manipulation action being specified by selecting one of the pressing manipulation action and the bouncing manipulation action.

3. The switch control method according to claim 2, wherein the target manipulation action is a bouncing manipulation action.

4. The switch control method according to claim 2, wherein the self-generating switch further comprises a button recognition module, and the button recognition module is electrically connected to the generator; and before the processor generates a current control message, the switch control method further comprises:

the processor reading a switch identifier characterizing the self-generating switch from the memory;

if the currently occurring manipulation action is the pressing manipulation action, then the processor acquiring current button information via the button recognition module, and updating the current button information in the memory;

if the currently occurring manipulation action is the bouncing manipulation action, then the processor acquiring the stored current button information from the memory; and the current manipulation information being determined based on the switch identifier, the currently occurring manipulation action, and the acquired current button information.

5. The switch control method according to claim 2, wherein the polarity recognition module includes a pressing recognition portion and a bouncing recognition portion; the pressing recognition portion is electrically connected to an induction portion of the generator and the processor, respectively, and the bouncing recognition portion is electrically connected to the induction portion of the generator and the processor, respectively;

the processor recognizes a currently occurring manipulation action on the button via the polarity recognition module comprising:

if the processor receives a specified signal sent by the pressing recognition portion, determining that the currently occurring manipulation action is the pressing manipulation action; the pressing recognition portion transmitting the specified signal to the processor only when the generator generates the first induced voltage; and if the processor receives the specified signal sent by the bouncing recognition portion, determining that the currently occurring manipulation action is the pressing manipulation action, the bouncing recognition portion sending the specified signal to the processor only when the generator generates the second induced voltage.

6. The switch control method according to claim 1, wherein the transformation rule comprises at least one of:

accumulating a first reference numerical value on the basis of the first numerical value to obtain the second numerical value;

accumulating a second reference numerical value on the basis of the first numerical value to obtain the second numerical value;

multiplying a third reference numerical value on the basis of the first numerical value to obtain the second numerical value; and obtaining the second numerical value by dividing the first numerical value by a fourth reference numerical value.

7. The switch control method according to claim 1, wherein the current control message further comprises signature information, the signature information being calculated based on a first key, and the signature information changing with a change of the current verification identifier; and the signature information is able to be verified by the receiving end through a second key, the first button matching the second key.

8. The switch control method according to claim 1, wherein the current verification identifier recorded in the current control message is a converted current verification identifier, a conversion manner being a first data conversion mode; and the current verification identifier verified by the receiving end is obtained by reversely converting the converted current verification identifier, a manner of reverse conversion being a second data conversion manner, and the first data conversion manner and the second data conversion manner being opposite data conversion manners.

9. The switch control method according to claim 1, wherein the wireless communication module is a Bluetooth module;
the receiving end receives a data packet according to a pre-set wake-up and sleep period, the wake-up and sleep period comprises alternating wake-up period and sleep period, and the receiving end only receives the data packet in the wake-up period; and
the processor sends the current control message to the receiving end via the wireless communication module specifically comprises:
the processor successively broadcasting N groups of data packets to outside via the Bluetooth module, such that the receiving end grabs at least one data packet during the wake-up period, each group of data packets comprising a plurality of data packets, and each data packet containing the current control packet; and a broadcast interval of adjacent data packets in the N groups of data packets matching a wake-up sleep period of the receiving end, with N≥2.

10. The switch control method according to claim 9, wherein
a duration of the wake-up period is greater than or equal to the broadcast interval of two adjacent groups of data packets; and
a duration of the sleep period is less than or equal to N−1 times the broadcast interval.

11. The switch control method according to claim 9, wherein the processor sequentially broadcasts N groups of data packets to the outside via the Bluetooth module, comprising:
the processor counting a time of the broadcast interval after starting to send a group of data packets, and sending out a corresponding other group of data packets when the count reaches a specified packet sending interval; and
the specified packet sending interval duration being in an interval range of 15 ms to 25 ms.

12. A self-generating switch, comprising a processor, a memory, a key, a generator, a reset component, a rectification module, an energy storage module, a voltage output module, and a wireless communication module, the wireless communication module and the memory being electrically connected to the processor, an induction portion of the generator being electrically connected to the energy storage module via the rectification module, and the energy storage module being electrically connected to the wireless communication module, the processor and the memory via the voltage output module, the reset component being able to be transmitted with a moving portion of the generator, and the button also being able to be directly or indirectly transmitted with the moving portion of the generator;
the reset component is configured such that if the pressing manipulation action of the button occurs, then the reset component deforms and generates a reset force to overcome the deformation;
and if the bouncing manipulation action of the button occurs, the reset component drives the moving portion of the generator under an action of the reset force;

the generator is configured such that if the pressing manipulation action of the button occurs, then the moving portion of the generator is directly or indirectly driven by the button such that the induction portion of the generator generates a first induced voltage, and if the bouncing manipulation action of the button occurs, the moving portion of the generator is driven by the reset component such that the generator generates a second induction voltage;
the rectification module is configured for storing first electric energy corresponding to the first induced voltage and/or second electric energy corresponding to the second induced voltage in the energy storage module;
the energy storage module is configured for transmitting the stored electrical energy to the voltage output module;
the voltage output module is configured for using the received electric energy to provide a required voltage to the processor, the memory and the wireless communication module so as to power on same;
the processor is configured for,
after the processor, the memory and the wireless communication module are powered on, generating and sending a corresponding current control message to the receiving end via the wireless communication module, and the current control message recording the current verification identifier and current manipulation information, such that the receiving end verifies whether a relationship between the current verification identifier and the stored historical verification identifier matches a preset transformation rule of the current verification identifier, and executing a control event corresponding to current manipulation information when the relationship matches the transformation rule, the historical verification identifier being determined according to the verification identifier recorded in a control message or a pairing message sent to the receiving end by the self-generating switch previously; the current manipulation information characterizing at least one of: the self-generating switch, the button that the self-generating switch currently receives the manipulation, a manipulation action currently occurring in the self-generating switch; the current manipulation information corresponding to at least one control event required to be executed by the receiving end; and
in one pressing manipulation action and one bouncing manipulation action which occur successively, with regard to at least one manipulation action therein, before, after or at the same time of generating and sending a corresponding current control message to the receiving end via the wireless communication module, also reading the current verification identifier from the memory, changing and updating the current verification identifier from a first numerical value to a second numerical value according to a preset transformation rule, and writing back the updated current verification identifier to the memory before the electric energy stored in the energy storage module is exhausted, the first numerical value being different from the second numerical value.

13. A receiving end control method based on a self-generating switch and a receiving end, applied to the receiving end, comprising:
receiving a current control message, the current control message being sent out by a self-generating switch via the switch control method according to claim 1;

verifying whether a relationship between the current verification identifier and the stored historical verification identifier matches the transformation rule; and executing a control event corresponding to the current manipulation information when the relationship matches the transformation rule.

14. The control method according to claim 13, comprising:
if the transformation rule is accumulating a first reference numerical value on the basis of the first numerical value to obtain the second numerical value, then verifying whether the relationship between the current verification identifier and the historical verification identifier matches the transformation rule, specifically comprising: verifying whether the current verification identifier is greater than the historical verification identifier, or verifying whether the current verification identifier is greater than the historical verification identifier, and a difference between the current verification identifier and the historical verification identifier matches the first reference numerical value;

if the transformation rule is subtracting the second reference numerical value on the basis of the first numerical value to obtain the second numerical value, then verifying whether the relationship between the current verification identifier and the historical verification identifier matches the transformation rule, specifically comprising: verifying whether the current verification identifier is less than the historical verification identifier, or verifying whether the current verification identifier is less than the historical verification identifier, and a difference between the current verification identifier and the historical verification identifier matches the second reference numerical value;

if the transformation rule is multiplying a third reference numerical value on the basis of the current verification identifier to obtain the second numerical value, then verifying whether the relationship between the current verification identifier and the historical verification identifier matches the transformation rule, specifically comprising: verifying whether the current verification identifier is greater than the historical verification identifier, or verifying whether the current verification identifier is greater than the historical verification identifier, and a ratio of the current verification identifier with the historical verification identifier matches the third reference numerical value; and if the transformation rule is dividing, by a fourth reference numerical value, on the basis of the current verification identifier to obtain the second numerical value, then verifying whether the relationship between the current verification identifier and the historical verification identifier matches the transformation rule, specifically comprising: verifying whether the current verification identifier is less than the historical verification identifier, or verifying whether the current verification identifier is less than the historical verification identifier, and a ratio of the current verification identifier with the historical verification identifier matches the fourth reference numerical value.

15. The receiving end control method according to claim 13, wherein
the receiving end is a wall switch, in which the control event comprises at least one of:
the wall switch being turned off;
the wall switch being open;
closing a designated function of the wall switch;
opening a designated function of the wall switch; and
sending a designated signal to outside.

16. The receiving end control method according to claim 13, wherein
the control event comprises at least one of:
switching a switch state of the receiving end, the switch state meaning that the receiving end is opened or closed; and
changing an operating parameter of the receiving end, the operating parameter being any variable quantization parameter during operation of the receiving end.

17. The receiving end control method according to claim 16, wherein
executing a control event corresponding to the current manipulation information specifically comprises:
according to the current manipulation information, detecting whether predefined state switching manipulation and parameter changing manipulation occur, or detecting whether the state switching manipulation and the parameter changing manipulation have occurred according to the current manipulation information and previously received manipulation information;
if the state switching manipulation occurs, switching a switch state of the receiving end;
if the parameter changing manipulation occurs, changing an operating parameter of the receiving end; and
the state switching manipulation being distinguished from the parameter changing manipulation.

18. The receiving end control method according to claim 16, wherein
executing a control event corresponding to the current manipulation information specifically comprises:
if the current manipulation information is manipulation information for starting to change, then starting to change the operating parameter of the receiving end;
if the current manipulation information is manipulation information for stopping changing, then stopping changing the operating parameter of the receiving end; and
the button and/or manipulation action characterized by the manipulation information for starting to change is different from the button and/or manipulation action characterized by the manipulation information for stopping changing.

19. The receiving end control method according to claim 13, wherein, with regard to the same button of the same switch, if the corresponding pressing manipulation information and bouncing manipulation information correspond to different control events, then
the historical verification identifier stored in the receiving end is determined according to the verification identifier recorded in the control message generated by a specified manipulation action; and the specified manipulation action is the pressing manipulation information or bouncing manipulation information or the key.

20. The receiving end control method according to claim 13, wherein the receiving end is any one of: a light, a fan, an automatic curtain, and a door bell.

* * * * *